(12) United States Patent
Ohno

(10) Patent No.: US 7,586,693 B2
(45) Date of Patent: Sep. 8, 2009

(54) TELEPHOTO LENS

(75) Inventor: Kazunori Ohno, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 67 days.

(21) Appl. No.: 11/961,726

(22) Filed: Dec. 20, 2007

(65) Prior Publication Data

US 2008/0158694 A1    Jul. 3, 2008

(30) Foreign Application Priority Data

Dec. 28, 2006    (JP)    ............................ P2006-355291

(51) Int. Cl.
G02B 13/02    (2006.01)
(52) U.S. Cl. ...................................... 359/747; 359/745
(58) Field of Classification Search ................. 359/745, 359/746, 747, 771, 772, 773
See application file for complete search history.

(56) References Cited

U.S. PATENT DOCUMENTS

| 4,709,998 | A | * | 12/1987 | Yamanashi | ................... 359/745 |
|---|---|---|---|---|---|
| 5,438,455 | A | | 8/1995 | Nakatsuji et al. | |
| 5,745,306 | A | | 4/1998 | Sato et al. | |
| 5,828,490 | A | | 10/1998 | Sato et al. | |
| 6,115,118 | A | | 9/2000 | Dunnegan et al. | |
| 6,927,926 | B2 | * | 8/2005 | Kasahara et al. | ............ 359/747 |

FOREIGN PATENT DOCUMENTS

| JP | 6-201989 A | 7/1994 |
|---|---|---|
| JP | 8-327897 A | 12/1996 |
| JP | 9-325269 A | 12/1997 |
| JP | 11-160617 A | 6/1999 |

OTHER PUBLICATIONS

Chinese Office Action dated Apr. 3, 2009, with English translation.

* cited by examiner

*Primary Examiner*—David N Spector
(74) *Attorney, Agent, or Firm*—Birch, Stewart, Kolasch & Birch, LLP

(57) ABSTRACT

To provide a lens system advantageous for downsizing a moving group and suitable for large aperture ratio formation and ultra telescopic formation while maintaining an excellent optical function from a long distance to a close range.

A first lens group having a positive refracting power, a second lens group having a negative refracting power, a third lens group having a positive refracting power, and a fourth lens group having a negative refracting power are provided in order from an object side. The first lens group includes a first sub group and a second sub group. The second sub group is provided with a refracting power stronger than that of the first sub group and a following condition equation is satisfied.

$$1.5 < f1a/f1b < 2.2 \qquad (1)$$

where, $f1a$ denotes a focal length of the first sub group and $f1b$ denotes a focal length of the second sub group.

24 Claims, 16 Drawing Sheets

FIG. 1A  EMBODIMENT 1 / INFINITY
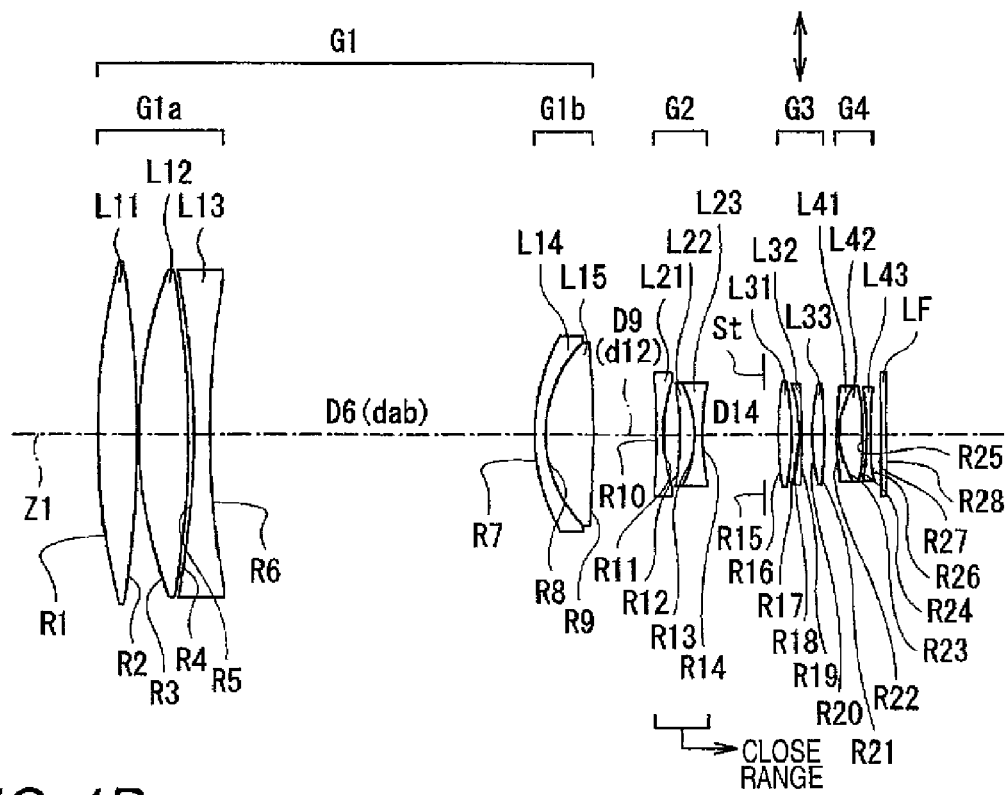
FIG. 1B  EMBODIMENT 1 / SHORT DISTANCE(2.9 m)
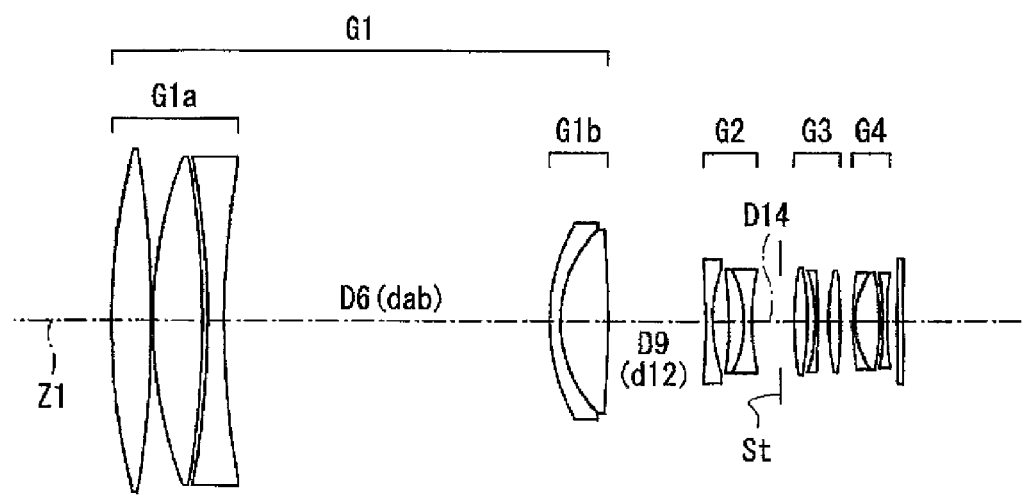

FIG. 2A  EMBODIMENT 2 / INFINITY
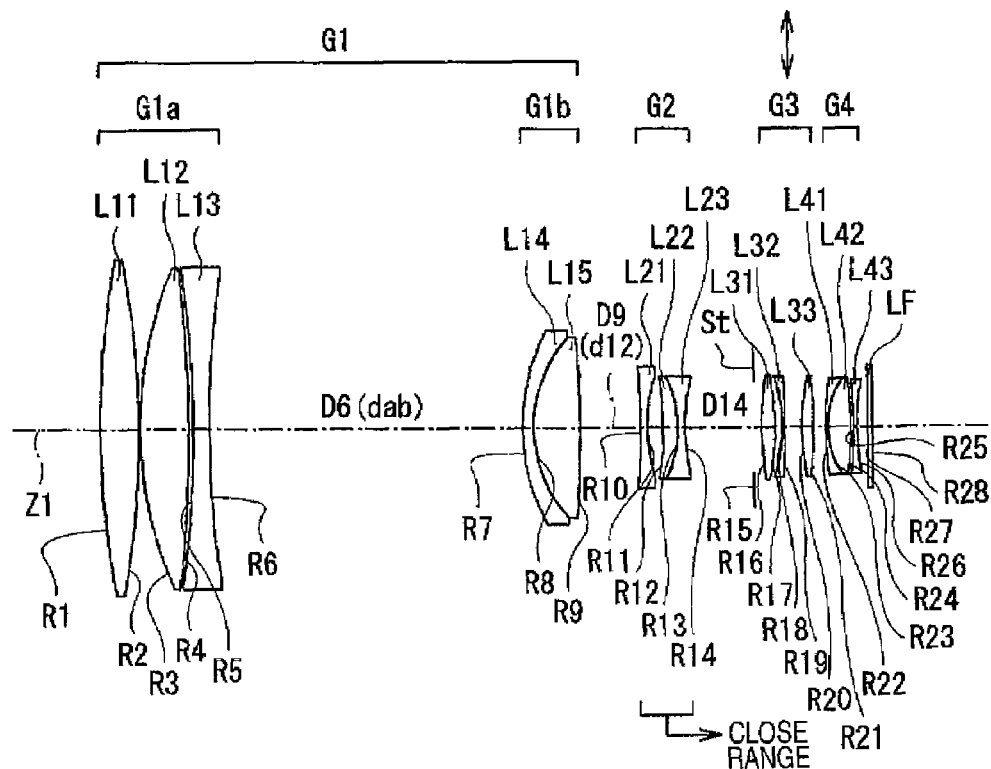
FIG. 2B  EMBODIMENT 2 / SHORT DISTANCE(2.9 m)
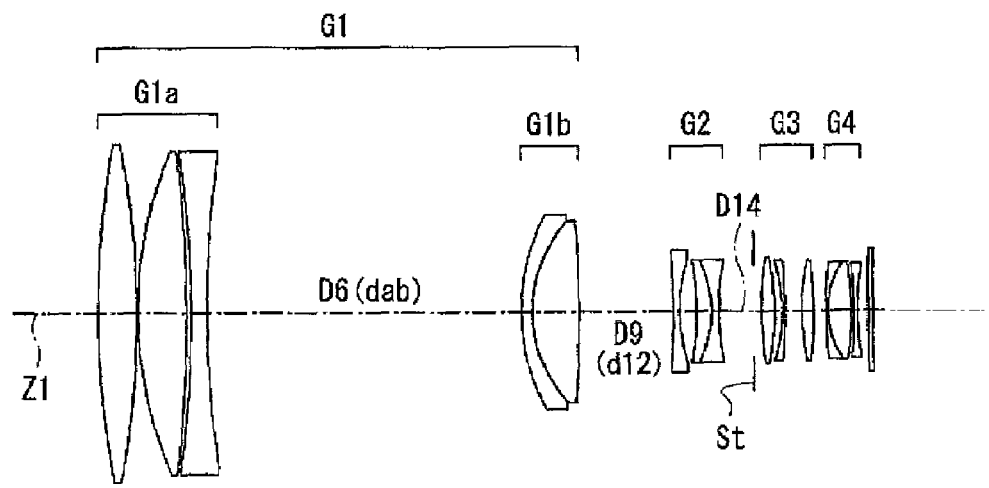

FIG. 3A  EMBODIMENT 3 / INFINITY
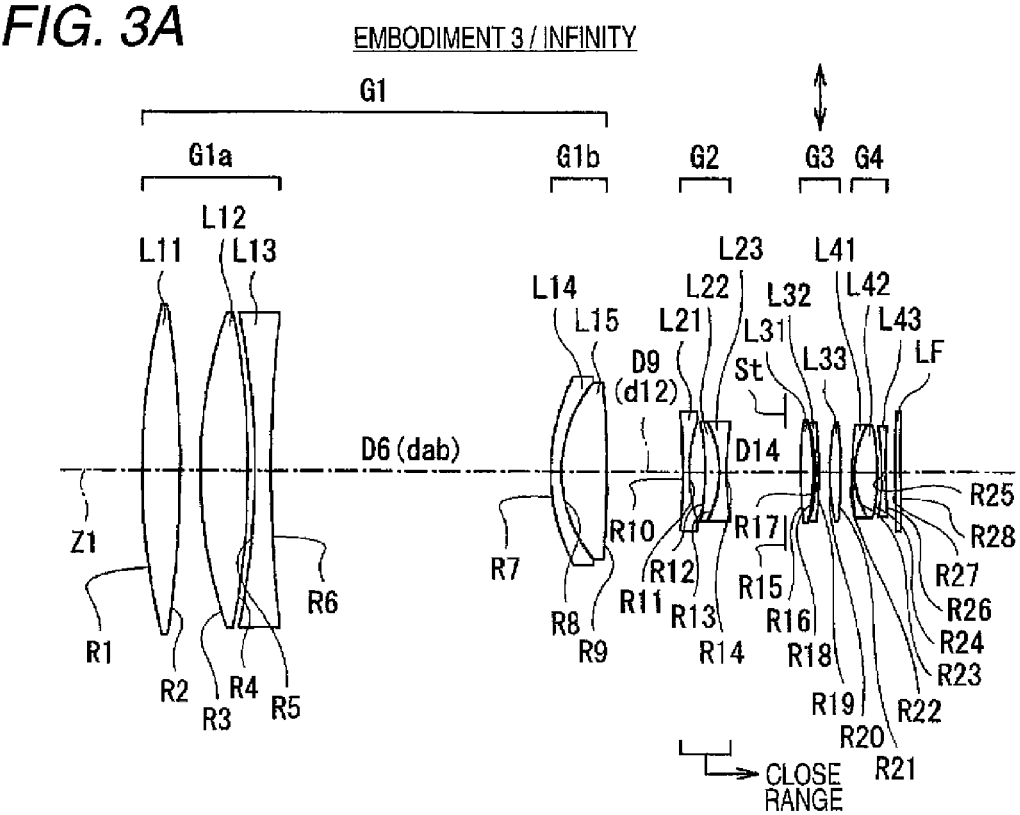
FIG. 3B  EMBODIMENT 3 / SHORT DISTANCE(2.9 m)
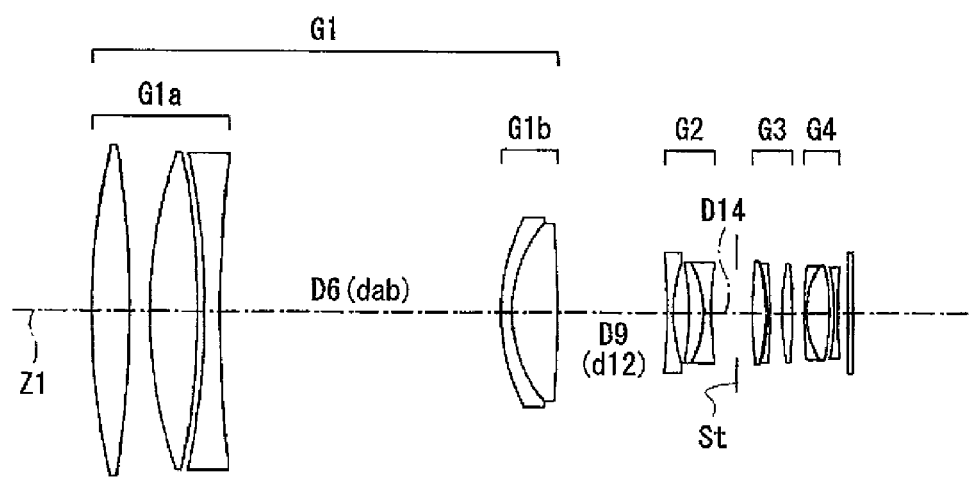

EMBODIMENT 4 / INFINITY

EMBODIMENT 4 / SHORT DISTANCE(2.9 m)

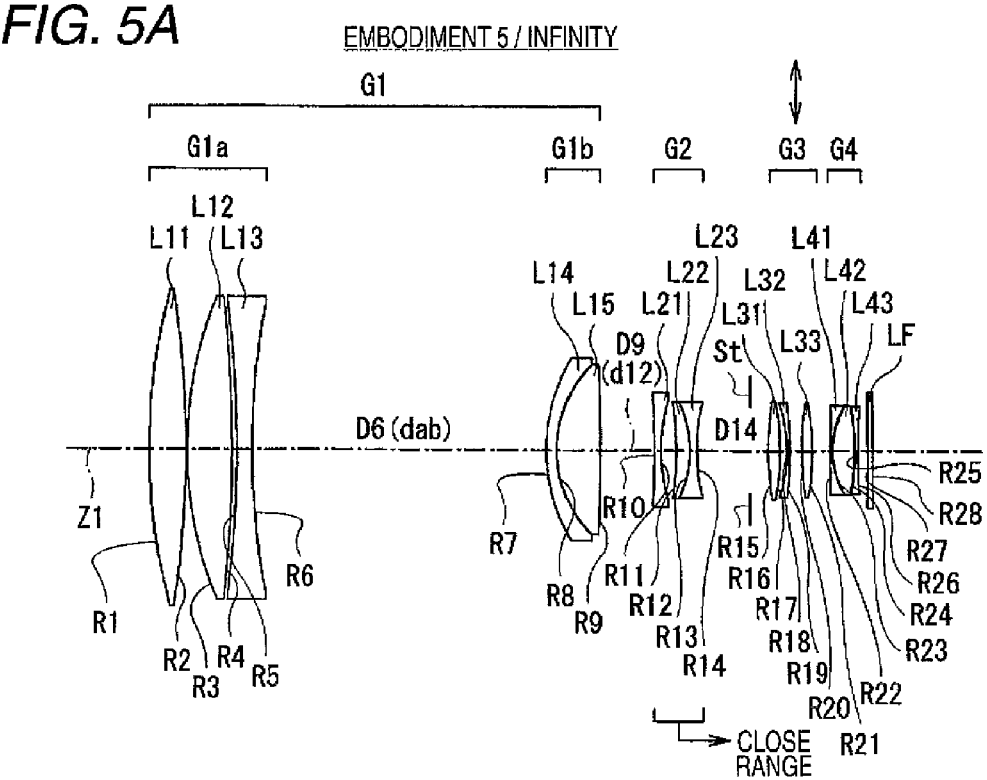
FIG. 5A — EMBODIMENT 5 / INFINITY
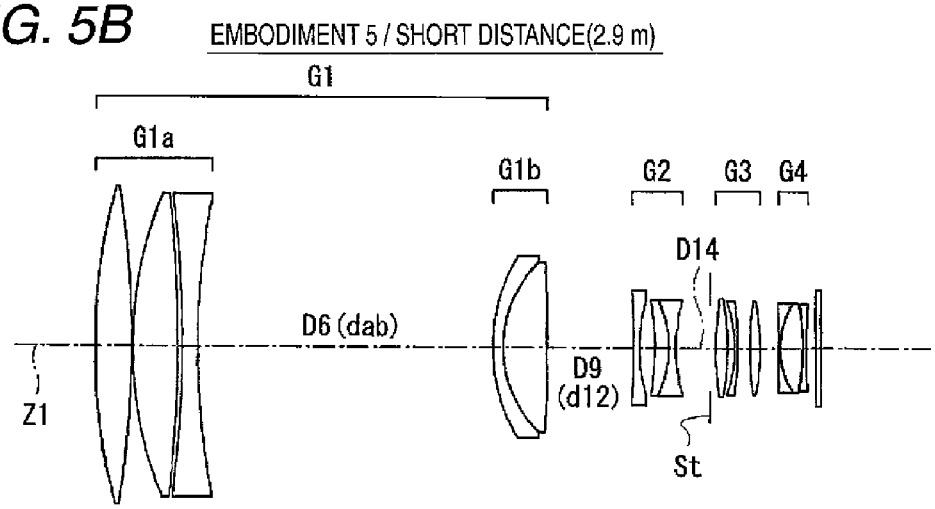
FIG. 5B — EMBODIMENT 5 / SHORT DISTANCE (2.9 m)

FIG. 6A

| | Si (SURFACE NUMBER) | Ri (RADIUS OF CURVATURE) | Di (SURFACE INTERVAL) | Ndi (REFRACTIVE INDEX) | νdj (ABBE NUMBER) |
|---|---|---|---|---|---|
| EMBODIMENT 1 / LENS DATA | | | | | |
| G1 G1a | 1 | 285.3877 | 16.0000 | 1.49700 | 81.6 |
| | 2 | -421.6575 | 0.5051 | 1.00000 | |
| | 3 | 185.7245 | 20.0000 | 1.49782 | 82.5 |
| | 4 | -388.9697 | 1.9992 | 1.00000 | |
| | 5 | -352.9749 | 6.5000 | 1.80400 | 46.6 |
| | 6 | 364.9762 | 131.1822 | 1.00000 | |
| G1b | 7 | 80.7518 | 4.5000 | 1.80400 | 46.6 |
| | 8 | 53.4171 | 19.0000 | 1.49700 | 81.6 |
| | 9 | -520.8937 | 25.2481 | 1.00000 | |
| G2 | 10 | -333.5433 | 2.7000 | 1.80400 | 46.6 |
| | 11 | 66.1588 | 6.6634 | 1.00000 | |
| | 12 | -128.4998 | 6.0000 | 1.84665 | 23.8 |
| | 13 | -45.9588 | 3.0000 | 1.48749 | 70.2 |
| | 14 | 95.7466 | 23.0326 | 1.00000 | |
| | 15 (DIAPHRAGM) | — | 8.0000 | | |
| G3 | 16 | 126.1382 | 5.3000 | 1.62041 | 60.3 |
| | 17 | -120.3545 | 3.0101 | 1.00000 | |
| | 18 | -72.0893 | 1.1000 | 1.80518 | 25.4 |
| | 19 | -302.0030 | 4.2508 | 1.00000 | |
| | 20 | 104.2272 | 4.7000 | 1.69679 | 55.5 |
| | 21 | -174.5058 | 5.0250 | 1.00000 | |
| G4 | 22 | 133.6799 | 1.0000 | 1.80400 | 46.6 |
| | 23 | 35.8750 | 9.5000 | 1.63980 | 34.5 |
| | 24 | -106.0068 | 1.2307 | 1.00000 | |
| | 25 | -130.9244 | 1.5000 | 1.78472 | 25.7 |
| | 26 | 127.2319 | 4.4570 | 1.00000 | |
| | 27 | ∞ | 2.0000 | 1.51633 | 64.1 |
| | 28 | ∞ | 74.7298 | 1.00000 | |

FIG. 6B

| EMBODIMENT 1 / VARIOUS DATA | | |
|---|---|---|
| FOCAL LENGTH | 392.00 | |
| FNO | 2.86 | |
| FIELD ANGLE (2ω°) | 6.30 | |
| MOVING INTERVAL | INFINITY | 2.9m |
| D9 | 25.2481 | 38.9296 |
| D14 | 23.0326 | 9.3511 |

FIG. 7A

| | EMBODIMENT 2 / LENS DATA | | | |
|---|---|---|---|---|
| Si (SURFACE NUMBER) | Ri (RADIUS OF CURVATURE) | Di (SURFACE INTERVAL) | Ndi (REFRACTIVE INDEX) | νdj (ABBE NUMBER) |
| 1 | 363.0487 | 16.0000 | 1.49700 | 81.6 |
| 2 | -363.0487 | 0.4983 | 1.00000 | |
| 3 | 164.7344 | 20.0000 | 1.43875 | 95.0 |
| 4 | -555.8349 | 2.0000 | 1.00000 | |
| 5 | -441.2222 | 6.5000 | 1.80400 | 46.6 |
| 6 | 441.2222 | 128.0040 | 1.00000 | |
| 7 | 84.0749 | 4.5000 | 1.80400 | 46.6 |
| 8 | 55.1015 | 19.0000 | 1.49700 | 81.6 |
| 9 | -506.2696 | 25.2072 | 1.00000 | |
| 10 | -350.2273 | 2.7000 | 1.80400 | 46.6 |
| 11 | 69.7742 | 6.6634 | 1.00000 | |
| 12 | -123.9246 | 6.0000 | 1.84665 | 23.8 |
| 13 | -47.5867 | 3.0000 | 1.48749 | 70.2 |
| 14 | 94.3419 | 23.0326 | 1.00000 | |
| 15 (DIAPHRAGM) | — | 8.0000 | 1.00000 | |
| 16 | 141.4874 | 5.3000 | 1.62041 | 60.3 |
| 17 | -109.0651 | 2.9983 | 1.00000 | |
| 18 | -69.5615 | 1.1000 | 1.80518 | 25.4 |
| 19 | -255.6977 | 6.7674 | 1.00000 | |
| 20 | 108.9724 | 4.7000 | 1.69679 | 55.5 |
| 21 | -165.8990 | 5.0250 | 1.00000 | |
| 22 | 133.0022 | 1.0000 | 1.80400 | 46.6 |
| 23 | 35.8757 | 9.5000 | 1.63980 | 34.5 |
| 24 | -139.4180 | 1.0962 | 1.00000 | |
| 25 | -209.1973 | 1.5000 | 1.78472 | 25.7 |
| 26 | 113.5403 | 4.4570 | 1.00000 | |
| 27 | ∞ | 2.0000 | 1.51632 | 64.1 |
| 28 | ∞ | 75.2378 | 1.00000 | |

Groups: G1 {G1a: surfaces 1–6; G1b: surfaces 7–9}; G2: surfaces 10–14; G3: surfaces 16–21; G4: surfaces 22–26.

FIG. 7B

| EMBODIMENT 2 / VARIOUS DATA | | |
|---|---|---|
| FOCAL LENGTH | 392.00 | |
| FNO | 2.86 | |
| FIELD ANGLE (2ω°) | 6.30 | |
| MOVING INTERVAL | INFINITY | 2.9m |
| D9 | 25.2072 | 38.9301 |
| D14 | 23.0326 | 9.3097 |

FIG. 8A

| | | EMBODIMENT 3 / LENS DATA | | | |
|---|---|---|---|---|---|
| | Si (SURFACE NUMBER) | Ri (RADIUS OF CURVATURE) | Di (SURFACE INTERVAL) | Ndi (REFRACTIVE INDEX) | νdj (ABBE NUMBER) |
| G1 G1a | 1 | 301.4627 | 16.0000 | 1.43387 | 95.2 |
| | 2 | -438.3291 | 8.5876 | 1.00000 | |
| | 3 | 199.8251 | 20.0000 | 1.49700 | 81.6 |
| | 4 | -341.6473 | 3.0944 | 1.00000 | |
| | 5 | -313.0121 | 6.5000 | 1.80400 | 46.6 |
| | 6 | 603.4801 | 116.7164 | 1.00000 | |
| G1b | 7 | 86.2239 | 4.5000 | 1.80400 | 46.6 |
| | 8 | 57.2983 | 19.0000 | 1.49700 | 81.6 |
| | 9 | -524.6356 | 31.3122 | 1.00000 | |
| G2 | 10 | -333.2984 | 2.7000 | 1.80400 | 46.6 |
| | 11 | 63.7076 | 6.6634 | 1.00000 | |
| | 12 | -108.1494 | 6.0000 | 1.84665 | 23.8 |
| | 13 | -44.8033 | 3.0000 | 1.48749 | 70.2 |
| | 14 | 134.5908 | 23.0326 | 1.00000 | |
| | 15 (DIAPHRAGM) | --- | 8.0000 | 1.00000 | |
| G3 | 16 | 178.3040 | 5.3000 | 1.62041 | 60.3 |
| | 17 | -94.0893 | 1.0431 | 1.00000 | |
| | 18 | -71.1153 | 1.1000 | 1.80518 | 25.4 |
| | 19 | -254.0964 | 4.6353 | 1.00000 | |
| | 20 | 98.6697 | 4.7000 | 1.69679 | 55.5 |
| | 21 | -225.4632 | 5.0250 | 1.00000 | |
| G4 | 22 | 172.9436 | 1.0000 | 1.80400 | 46.6 |
| | 23 | 37.5962 | 9.5000 | 1.63980 | 34.5 |
| | 24 | -94.8469 | 1.8338 | 1.00000 | |
| | 25 | -113.9732 | 1.5000 | 1.78472 | 25.7 |
| | 26 | 171.0152 | 4.4570 | 1.00000 | |
| | 27 | ∞ | 2.0000 | 1.51632 | 64.1 |
| | 28 | ∞ | 77.7819 | 1.00000 | |

FIG. 8B

| EMBODIMENT 3 / VARIOUS DATA | | |
|---|---|---|
| FOCAL LENGTH | 392.00 | |
| FNO | 2.86 | |
| FIELD ANGLE (2ω°) | 6.30 | |
| MOVING INTERVAL | INFINITY | 2.9m |
| D9 | 31.3122 | 45.0768 |
| D14 | 23.0326 | 9.2680 |

FIG. 9A

| | Si (SURFACE NUMBER) | Ri (RADIUS OF CURVATURE) | Di (SURFACE INTERVAL) | Ndi (REFRACTIVE INDEX) | νdj (ABBE NUMBER) |
|---|---|---|---|---|---|
| | \multicolumn{5}{c}{EMBODIMENT 4 / LENS DATA} |

| Group | | Si | Ri | Di | Ndi | νdj |
|---|---|---|---|---|---|---|
| G1 | G1a | 1 | 261.3413 | 16.0000 | 1.49782 | 82.5 |
| | | 2 | −463.4991 | 0.5020 | 1.00000 | |
| | | 3 | 194.9395 | 20.0000 | 1.49782 | 82.5 |
| | | 4 | −378.2573 | 1.9999 | 1.00000 | |
| | | 5 | −347.8129 | 6.5000 | 1.78800 | 47.4 |
| | | 6 | 369.3236 | 130.3911 | 1.00000 | |
| | G1b | 7 | 79.8824 | 4.5000 | 1.80400 | 46.6 |
| | | 8 | 52.8230 | 19.0000 | 1.49782 | 82.5 |
| | | 9 | −594.8733 | 23.9019 | 1.00000 | |
| G2 | | 10 | −370.4374 | 2.7000 | 1.80400 | 46.6 |
| | | 11 | 71.5103 | 6.0000 | 1.00000 | |
| | | 12 | −125.8614 | 6.0000 | 1.84666 | 23.8 |
| | | 13 | −48.0671 | 3.0000 | 1.48749 | 70.2 |
| | | 14 | 86.6752 | 23.0326 | 1.00000 | |
| | | 15 (DIAPHRAGM) | — | 8.0000 | 1.00000 | |
| G3 | | 16 | 114.4394 | 5.3000 | 1.62041 | 60.3 |
| | | 17 | −114.4394 | 3.0186 | 1.00000 | |
| | | 18 | −61.9872 | 1.1000 | 1.80518 | 25.4 |
| | | 19 | −219.9584 | 7.9979 | 1.00000 | |
| | | 20 | 187.9856 | 4.7000 | 1.69680 | 55.5 |
| | | 21 | −98.4263 | 5.0250 | 1.00000 | |
| G4 | | 22 | 416.1761 | 1.0000 | 1.77250 | 49.6 |
| | | 23 | 37.0192 | 9.5000 | 1.66446 | 35.9 |
| | | 24 | −85.0987 | 1.6590 | 1.00000 | |
| | | 25 | −92.8686 | 1.5000 | 1.76182 | 26.5 |
| | | 26 | 265.6180 | 4.4570 | 1.00000 | |
| | | 27 | ∞ | 2.0000 | 1.51680 | 64.1 |
| | | 28 | ∞ | 75.8633 | 1.00000 | |

FIG. 9B

| EMBODIMENT 4 / VARIOUS DATA | | |
|---|---|---|
| FOCAL LENGTH | \multicolumn{2}{c}{392.00} |
| FNO | \multicolumn{2}{c}{2.86} |
| FIELD ANGLE (2ω°) | \multicolumn{2}{c}{6.30} |
| MOVING INTERVAL | INFINITY | 2.9m |
| D9 | 23.9019 | 37.6106 |
| D14 | 23.0326 | 9.3239 |

FIG. 10A

| | Si (SURFACE NUMBER) | Ri (RADIUS OF CURVATURE) | Di (SURFACE INTERVAL) | Ndi (REFRACTIVE INDEX) | νdj (ABBE NUMBER) |
|---|---|---|---|---|---|
| | EMBODIMENT 5 / LENS DATA | | | | |

| | | Si | Ri | Di | Ndi | νdj |
|---|---|---|---|---|---|---|
| G1 | G1a | 1 | 267.5903 | 16.0000 | 1.43875 | 95.0 |
| | | 2 | -435.4726 | 0.4998 | 1.00000 | |
| | | 3 | 171.6070 | 20.0000 | 1.49700 | 81.6 |
| | | 4 | -585.5178 | 2.0683 | 1.00000 | |
| | | 5 | -498.3050 | 6.5000 | 1.78800 | 47.4 |
| | | 6 | 340.1591 | 128.3489 | 1.00000 | |
| | G1b | 7 | 77.1370 | 4.5000 | 1.80400 | 46.6 |
| | | 8 | 51.5796 | 19.0000 | 1.49700 | 81.6 |
| | | 9 | -1061.1332 | 23.5830 | 1.00000 | |
| G2 | | 10 | -370.3571 | 2.7000 | 1.80400 | 46.6 |
| | | 11 | 73.0766 | 6.6634 | 1.00000 | |
| | | 12 | -134.9265 | 6.0000 | 1.84665 | 23.8 |
| | | 13 | -48.9618 | 3.0000 | 1.48749 | 70.2 |
| | | 14 | 80.0870 | 23.0326 | 1.00000 | |
| | | 15 (DIAPHRAGM) | — | 8.0000 | | |
| G3 | | 16 | 132.5350 | 5.3000 | 1.62041 | 60.3 |
| | | 17 | -115.0559 | 3.0009 | 1.00000 | |
| | | 18 | -64.7375 | 1.1000 | 1.80518 | 25.4 |
| | | 19 | -231.6266 | 5.5066 | 1.00000 | |
| | | 20 | 138.8548 | 4.7000 | 1.69679 | 55.5 |
| | | 21 | -114.2994 | 8.0251 | 1.00000 | |
| G4 | | 22 | 668.4023 | 1.0000 | 1.80400 | 46.6 |
| | | 23 | 39.3335 | 19.5000 | 1.66362 | 38.3 |
| | | 24 | -102.4015 | 0.1000 | 1.00000 | |
| | | 25 | -134.2996 | 1.5000 | 1.69465 | 30.4 |
| | | 26 | 241.4444 | 4.4570 | 1.00000 | |
| | | 27 | ∞ | 2.0000 | 1.51632 | 64.1 |
| | | 28 | ∞ | 76.6830 | 1.00000 | |

FIG. 10B

| EMBODIMENT 5 / VARIOUS DATA | | |
|---|---|---|
| FOCAL LENGTH | colspan="2" 392.00 | |
| FNO | colspan="2" 2.86 | |
| FIELD ANGLE (2ω°) | colspan="2" 6.30 | |
| MOVING INTERVAL | INFINITY | 2.9m |
| D9 | 23.5830 | 37.3169 |
| D14 | 23.0326 | 9.2987 |

FIG. 11

| VALUE CONCERNING CONDITIONAL EXPRESSION | | | | | |
|---|---|---|---|---|---|
| CONDITIONAL EXPRESSION | EMBODIMENT 1 | EMBODIMENT 2 | EMBODIMENT 3 | EMBODIMENT 4 | EMBODIMENT 5 |
| (1) f1a/f1b | 1.922 | 1.788 | 1.838 | 1.879 | 1.810 |
| (2) f1a/f | 0.937 | 0.906 | 0.944 | 0.925 | 0.914 |
| (3) dab/d12 | 5.196 | 5.078 | 3.728 | 5.661 | 5.442 |
| (4) (R2+R1)/(R2−R1) | 0.193 | 0.000 | 0.185 | 0.279 | 0.239 |
| (5) f1b/R9 | −0.367 | −0.393 | −0.384 | −0.324 | −0.186 |
| (6) dab/f | 0.335 | 0.327 | 0.298 | 0.333 | 0.327 |
| (7) $\nu$n1 | 46.6 | 46.6 | 46.6 | 49.6 | 46.6 |
| (8) f3/fm | 0.736 | 0.736 | 0.736 | 0.736 | 0.737 |

TELEPHOTO LENS

CROSS-REFERENCE TO RELATED APPLICATIONS

This application is based on and claims priority under 35 USC 119 from Japanese Patent Application No. 2006-355291 filed Dec. 28, 2006.

BACKGROUND

1. Technical Field

The present invention relates to a telephoto lens of an inner focus type preferable for a photographic camera or an electronic still camera, particularly, a single-lens reflex camera or the like, particularly relates to a telephoto lens having a large aperture ratio and of an ultra telescopic type (for example, full aperture F-number of about 2.8, focal length of about 400 mm).

2. Related Art

In a related art, a large aperture ratio telephoto lens of an inner focus type in which an full aperture F-number is as bright as about 2.8 and a focal length is about 300 mm is supplied to the market as a telephoto lens which is comparatively compact, well-arranged, having excellent way of us, however, there is a strong market request for a large aperture ratio ultra telephoto lens having a longer focal length. Generally, a telephoto lens includes a positive lens group having a focal length shorter than a focal length of a total system, and the positive lens group is arranged on an object side. The telephoto lens also includes a rear group having a negative refracting power is arranged successive to the positive lens group, and a focal length is enlarged at the rear group so as to have a predetermined focal length. On the other hand, in recent years, from a necessity of contracting a close range in accordance with a request from the market of enlarging a photographic range, a main current is constituted by a telephoto lens of an inner focal type capable of shortening a focusing amount (refer to Patent Reference 1 (JP-A-6-201989) corresponding to U.S. Pat. No. 5,438,455, Patent Reference 2 (JP-A-8-327897) corresponding to U.S. Pat. No. 5,745,306, Patent Reference 3 (JP-A-9-325269) corresponding to U.S. Pat. No. 5,828,490, and Patent Reference 4 (JP-A-11-160617) corresponding to U.S. Pat. No. 6,115,188). In a related art, it is known that arranging a first group has a positive refracting power, a second lens group has a negative refracting power, and a third lens group has a positive refracting power in order from an object side and a focusing group is the second lens group. Further, it is known that at least a portion of the second lens group or the third lens group is moved for vibration isolation in a direction orthogonal to an optical axis. In a case of such a constitution, when a front group is constituted by the first lens group and the second lens group, a total of the front group is provided with an extremely weak refracting power. According to a large aperture ratio telephoto lens, at a front group, a first lens group is further divided into two positive sub groups and various aberration amounts successively generated at the first lens group are dispersed to reduce to thereby enable to constitute a lens system having a bright F value.

When the first lens group is constructed by a constitution of being divided into two positive sub groups, as is seen in, for Patent Reference 1, there is frequently constructed a constitution in which the positive refracting power of the first sub group arranged on the object side is made to be larger than the positive refracting power of the successive second sub group (or as is seen in Patent Reference 2, the refracting power of the first sub group and the refracting power of the second sub group are made to be substantially to the same degree). According thereto, it is one of important problems to shorten a lens total length in a specification of a telephoto lens and the constitution is a constitution most effective for achieving the object. For that object, in the background art, there is constructed a constitution of a lens shape for making a spherical aberration particularly having a high sensitivity as small as possible while pertinently selecting glass used such that anomalous dispersion glass is used for correcting a chromatic aberration in the first sub group having a stronger positive refracting power. On the other hand, the second sub group is provided with a positive refracting power less than that of the first sub group, so an amount of generating a spherical aberration is also small. Therefore, the second sub group is constituted by a shape mainly to correct Off-Axis aberrations such as a field curvature.

Meanwhile, in a case of designing a large aperture ratio/ultra telescopic type lens having, for example, an full aperture F-number of about 2.8 and a focal length of about 400 mm, it is conceivable to proportionally enlarge to use a telephoto lens having, for example, a focal length of about 300 mm which is designed to provide a high performance. However, by simply proportionally enlarging the telephoto lens of the background art, a diaphragm mechanism, a focusing mechanism, and a vibration isolation mechanism and the like cannot sufficiently be converged to be compact, there is constituted a lens having a large aperture diameter, increasing a weight of moving groups and having poor operability. In order to resolve such a problem, it is particularly necessary to retrain a diaphragm diameter produced by long focal point formation from being increased. In the case of the telephoto lens of the inner focus type, as moving groups for focusing or vibration isolation, groups before and after the diaphragm are frequently used. Therefore, by restraining the diaphragm diameter, the lens can be arranged compactly without enlarging a focusing system or a vibration isolation system arranged before and after the diaphragm. Therefore, it has been desired to develop a large aperture ratio/ultra telescopic lens capable of restraining a diaphragm diameter to be small and promoting operability in comparison with lens constitutions described in the respective patent references. For that object, it is necessary to devise a necessary condition different from that of the lens system of the background art. Particularly, it is conceivable to optimize constitutions of the first lens group and the second lens group from a view point different from that of the background art. For example, although according to the background art, as described above, the positive refracting power of the first sub group in the first lens group tends to be relatively increased, it is conceivable to constitute a distribution of refracting powers different therefrom.

The invention has been carried out in view of such a problem and it is an object thereof to provide a telephoto lens capable of providing a lens system advantageous for downsizing moving groups and suitable for large aperture ratio formation and ultra telescopic formation while maintaining an excellent optical performance from a long distance to a close range.

SUMMARY

A telephoto lens according to a first aspect of the invention includes, in order from an object side, a first lens group, a second lens group, a third lens group and fourth lens group. The first lens group has a positive refracting power, the first lens group including a first sub group and a second sub group. The second lens group has a negative refracting power. The third lens group has a positive refracting power. The fourth lens group has a negative refracting power. When focusing from infinity to a near point, the second lens group is moved to an image side in an optical axis direction. The first sub group includes two biconvex lenses and a biconcave lens, and the second sub group includes a negative lens and a positive lens. The following Conditional Expression (1) is satisfied:

$$1.5 < f1a/f1b < 2.2 \quad (1)$$

where, f1a denotes a focal length of the first sub group, and f1b denotes a focal length of the second sub group.

In the telephoto lens according to the first aspect of the invention, it is arranged with the first lens group having the positive refracting power, the second lens group having the negative refracting power, the third lens group having the positive refracting power, and the fourth lens group having the negative refracting power in order from the object side and the focusing group is the second lens group. By satisfying Conditional Expression (1), the refracting power of the second sub group is pertinently made to be larger than that of the first sub group, for example, when an aperture diaphragm is arranged immediately before the third lens group, a diaphragm diameter is made to be easy to be reduced by reason mentioned later. Thereby, it is easy to provide a lens system advantageous for downsizing a moving group and suitable for large aperture formation and ultra telescopic formation while maintaining an excellent optical performance from a long distance to a close range.

Further, in the telephoto lens according to the first aspect of the invention, by pertinently adopting to satisfy the following preferable conditions, small-sized formation and high performance formation can further be easy to be achieved.

In the telescopic lens according to the first aspect of the invention, it is preferable that the following Conditional Expressions (2) to (3) are further satisfied:

$$0.85 < f1a/f < 1.05 \quad (2)$$

$$3.0 < dab/d12 < 6.0 \quad (3)$$

where, f denotes a focal length of the telephoto lens, f1a denotes the focal length of the first sub group, dab denotes an interval between the first sub group and the second sub group on the optical axis, and d12 denotes an interval between the first lens group and the second lens group on the optical axis.

In the telescopic lens according to the first aspect of the invention, it is preferable that the following Condition Expressions (4) to (6) are further satisfied:

$$-0.05 < (R2+R1)/(R2-R1) < 0.30 \quad (4)$$

$$-0.50 < f1b/R9 < 0.0 \quad (5)$$

$$0.27 < dab/f < 0.35 \quad (6)$$

where, f denotes the focal length of the telephoto lens, f1b denotes the focal length of the second sub group, dab denotes the interval between the first sub group and the second sub group, R1 denotes a radius of curvature of an object-side surface of the most object-side lens in the first sub group, R2 denotes a radius of curvature of an image-side surface of the most object-side lens in the first sub group, and R9 denotes a radius of curvature of an image-side surface of the most image-side lens in the second sub group.

In the telescopic lens according to the first aspect of the invention, it is preferable that the fourth lens group includes in order from the object side, a cemented lens, a negative lens. The cemented lens has a negative lens and a positive lens. The following Conditional Expression (7) is satisfied:

$$40 < vn1 < 55 \quad (7)$$

where, vn1 denotes Abbe number of the negative lens on the object side the most in the fourth lens group.

In the telescopic lens according to the first aspect of the invention, it is preferable that the following Conditional Expression (8) is further satisfied:

$$0.65 < f3/fm < 0.8 \quad (8)$$

where, f3 denotes a focal length of the third lens group, and fm denotes a composite focal length of the third lens group and the fourth lens group.

A telephoto lens according to a second aspect of the invention includes, in order from an object side, a first lens group, a second lens group, a third lens group and a fourth lens group. The first lens group has a positive refracting power, the first lens group including a first sub group and a second sub group. The second lens group has a negative refracting power. The third lens has a positive refracting power. The fourth lens group having a negative refracting power. When focusing from infinity to a near point, the second lens group is moved to an image side in an optical axis direction. The first sub group includes two biconvex lenses and a biconcave lens, and the second sub group includes a negative lens and a positive lens, and The following Conditional Expressions (4) and (6) are satisfied:

$$-0.05 < (R2+R1)/(R2-R1) < 0.30 \quad (4)$$

$$0.27 < dab/f < 0.35 \quad (6)$$

where, f denotes a focal length of the telephoto lens, dab denotes an interval between the first sub group and the second sub group on the optical axis, R1 denotes a radius of curvature of an object-side surface of the most object-side lens in the first sub group, and R2 denotes a radius of curvature of an image-side surface of the most object-side lens in the first sub group.

In the telephoto lens according to the second aspect of the invention, in a constitution arranged with the first lens group having the positive refracting power, the second lens group having the negative refracting power, the third lens group having the positive refracting power, and the fourth lens group having the negative refracting power in order from the object side and the focusing group is the second lens group. By satisfying Conditional Expressions (4) and (6), lens shapes and a group arrangement in the first lens group are optimized, even when downsizing of the moving group is achieved by restraining a diaphragm diameter to be small, an excellent optical function is made to be easy to be maintained from a long distance to a close range and a lens system suitable for large aperture diameter formation and ultra telescopic formation are made to be easy to be provided.

Further, in the telephoto lens according to the second aspect of the invention, small-sized formation and high performance formation can further be made to be achieved by pertinently adopting to satisfy the following preferable conditions.

In the telephoto lens according to the second aspect of the invention, it is preferable that the following Conditional Expression (5) is further satisfied:

$$-0.50 < f1b/R9 < 0.0 \quad (5)$$

where, f1b denotes a focal length of the second sub group, and

R9 denotes a radius of curvature of an image-side surface of the most image-side lens in the second sub group.

In the telephoto lens according to the second aspect of the invention, it is preferable that he fourth lens group includes in order from the object side, a cemented lens an negative lens. The cemented lens has a negative lens and a positive lens. The following Conditional Expression (7) is satisfied:

$$40 < vn1 < 55 \quad (7)$$

where, vn1 denotes Abbe number of the negative lens on the object side the most in the fourth lens group.

In the telephoto lens according to the second aspect of the invention, it is preferable that the following Conditional Expression (8) is satisfied:

$$0.65 < f3/fm < 0.8 \quad (8)$$

where, f3 denotes a focal length of the third lens group, and fm denotes a composite focal length of the third lens group and the fourth lens group.

According the telephoto lens according to the first or the second aspect of the invention, the first lens group having the positive refracting power, the second lens group having the negative refracting power, the third lens group having the positive refracting power, and the fourth lens group having the negative refracting power are arranged successively from the object side, the second lens group is made to constitute the focusing group, and the constitution is optimized by satisfying the pertinent conditions different from those of the background art, and therefore, there can be provided a lens system advantageous for downsizing the moving group and suitable for large aperture ratio formation and ultra telescopic formation while maintaining an excellent optical function from a long distance to a close range.

BRIEF DESCRIPTION OF THE DRAWINGS

FIG. 1A and FIG. 1B illustrate lens sectional views in correspondence with a telephoto lens according to an embodiment 1 of the invention. FIG. 1A shows a section in focused on infinity, and FIG. 1B shows a section in focused on a short distance.

FIG. 2A and FIG. 2B illustrate lens sectional views in correspondence with a telephoto lens according to an embodiment 2 of the invention. FIG. 2A shows a section in focused on infinity, and FIG. 2B shows a section in focused on a short distance.

FIG. 3A and FIG. 3B illustrate lens sectional views in correspondence with a telephoto lens according to an embodiment 3 of the invention. FIG. 3A shows a section in focused on infinity, and FIG. 3B shows a section in focused on a short distance.

FIG. 4A shows a section in focused on infinity, and FIG. 4B shows a section in focused on a short distance.

FIG. 5A and FIG. 5B illustrate lens sectional views in correspondence with a telephoto lens according to an embodiment 5 of the invention. FIG. 5A shows a section in focused on infinity and FIG. 5B shows a section in focused on a short distance.

FIG. 6A and FIG. 6B illustrate diagrams showing a lens data of the telephoto lens according to the embodiment 1 of the invention.

FIG. 7A and FIG. 7B illustrate diagrams showing a lens data of the telephoto lens according to the embodiment 2 of the invention.

FIG. 8A and FIG. 8B illustrate diagrams showing a lens data of the telephoto lens according to the embodiment 3 of the invention.

FIG. 9A and FIG. 9B illustrate diagrams showing a lens data of the telephoto lens according to the embodiment 4 of the invention.

FIG. 10A and FIG. 10B illustrate diagrams showing a lens data of the telephoto lens according to the embodiment 5 of the invention.

FIG. 11 is a diagram collectively showing values with regard to conditional expressions for the respective embodiments.

FIG. 12A shows a spherical aberration, FIG. 12B shows an astigmatism aberration, FIG. 12C shows a distortion, and FIG. 12D shows a chromatic aberration of magnification.

FIG. 13A shows a spherical aberration, FIG. 13B shows an astigmatism aberration, FIG. 13C shows a distortion, and FIG. 13D shows a chromatic aberration of magnification.

FIG. 14A shows a spherical aberration, FIG. 14B shows an astigmatism aberration, FIG. 14C shows a distortion, and FIG. 14D shows a chromatic aberration of magnification.

FIG. 15A shows a spherical aberration, FIG. 15B shows an astigmatism aberration, FIG. 15C shows a distortion, and FIG. 15D shows a chromatic aberration of magnification.

FIG. 16A shows a spherical aberration, FIG. 16B shows an astigmatism aberration, FIG. 16C shows a distortion, and FIG. 16D shows a chromatic aberration of magnification.

FIG. 17A shows a spherical aberration, FIG. 17B shows an astigmatism aberration, FIG. 17C shows a distortion, and FIG. 17D shows a chromatic aberration of magnification.

FIG. 18A shows a spherical aberration, FIG. 18B shows an astigmatism aberration, FIG. 18C shows a distortion, and FIG. 18D shows a chromatic aberration of magnification.

FIG. 19A shows a spherical aberration, FIG. 19B shows an astigmatism aberration, FIG. 19C shows a distortion, and FIG. 19D shows a chromatic aberration of magnification.

FIG. 20A shows a spherical aberration, FIG. 20B shows an astigmatism aberration, FIG. 20C shows a distortion, and FIG. 20D shows a chromatic aberration of magnification.

FIG. 21A shows a spherical aberration, FIG. 21B shows an astigmatism aberration, FIG. 21C shows a distortion, and FIG. 21D shows a chromatic aberration of magnification.

DETAILED DESCRIPTION

An embodiment of the invention will be explained in details in reference to the drawings as follows.

Figure 4A:
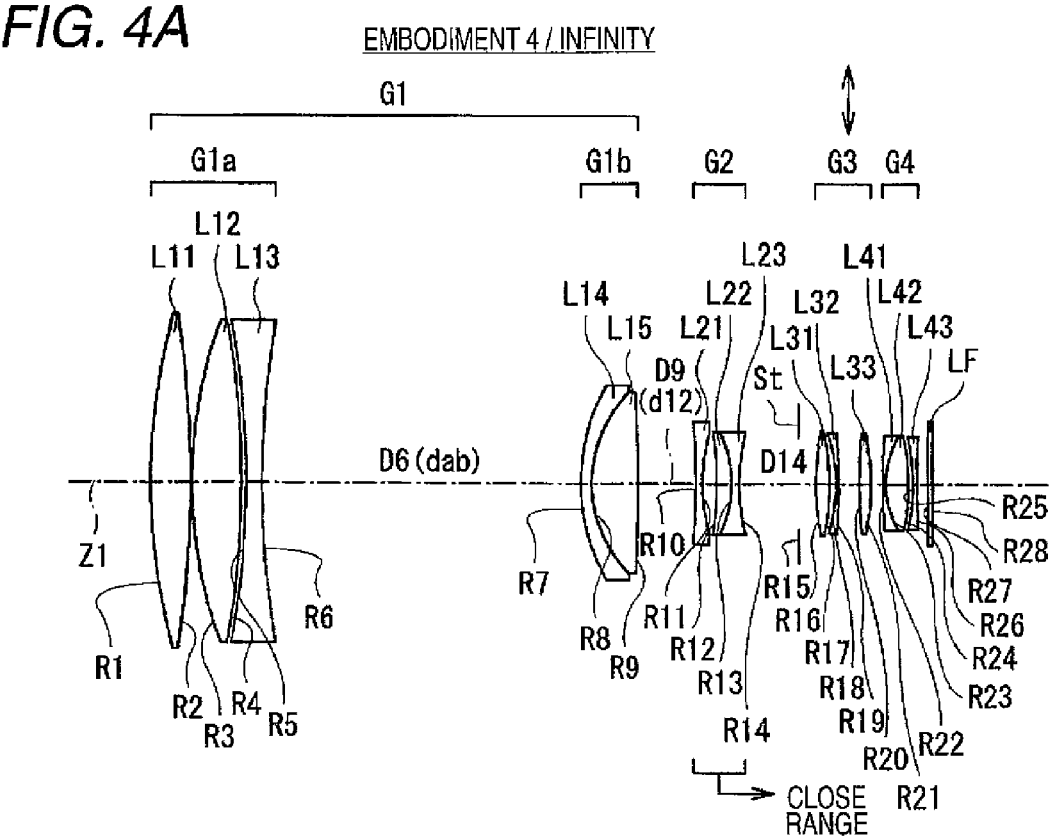
FIG. 4A and FIG. 4B illustrate lens sectional views in correspondence with a telephoto lens according to an embodiment 4 of the invention.
Figure 4B:
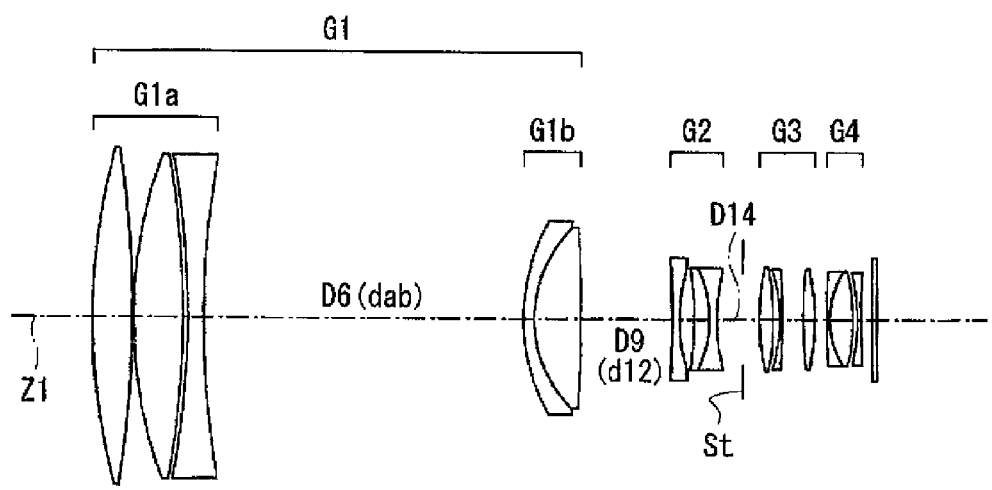
Figures 12A, 12B, 12C, 12D:
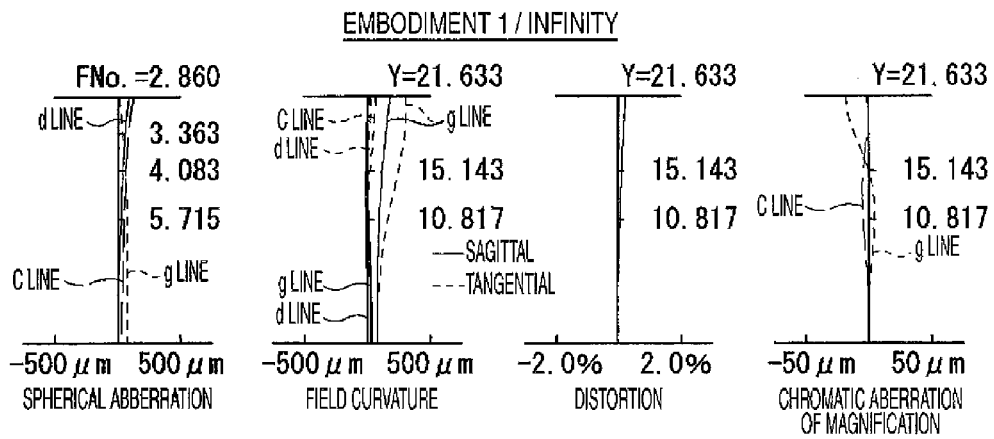
FIG. 12A, FIG. 12B, FIG. 12C, FIG. 12D illustrate aberration diagrams showing various aberrations in the telephoto lens focused on infinity according to the embodiment 1 of the invention.
Figures 13A, 13B, 13C, 13D:
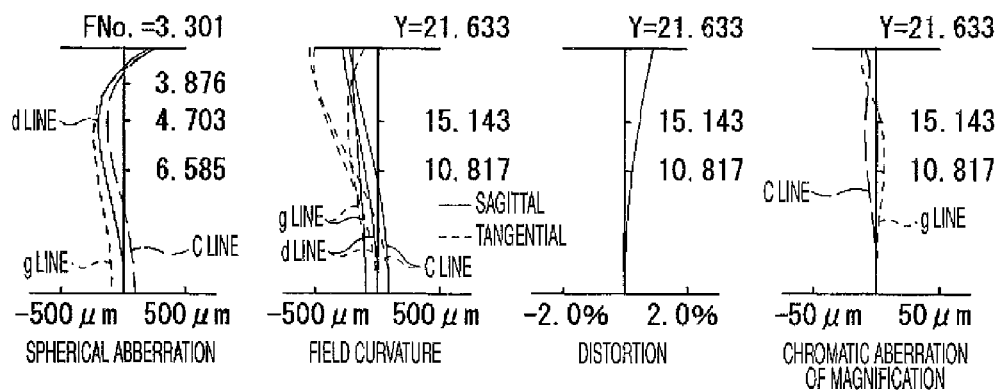
FIG. 13A, FIG. 13B, FIG. 13C, FIG. 13D illustrate aberration diagrams showing various aberrations in the telephoto lens focused on the short distance according to the embodiment 1 of the invention.
Figures 14A, 14B, 14C, 14D:
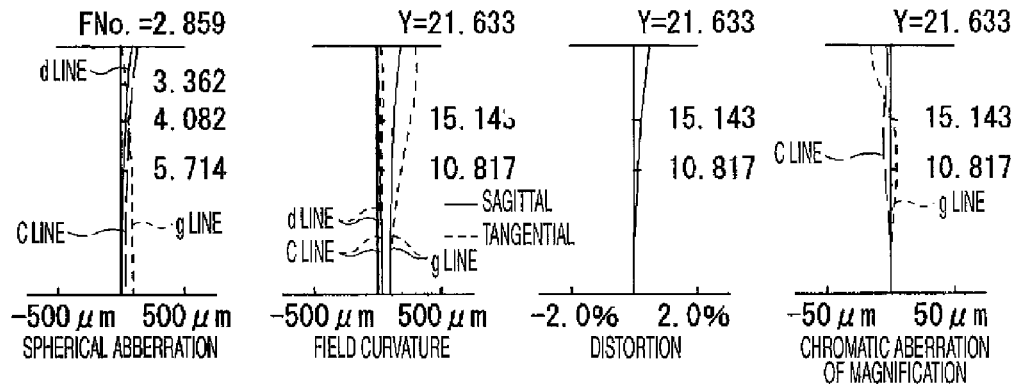
FIG. 14A, FIG. 14B, FIG. 14C, FIG. 14D illustrate aberration diagrams showing various aberrations in the telephoto lens focused on infinity according to the embodiment 2 of the invention.
Figures 15A, 15B, 15C, 15D:
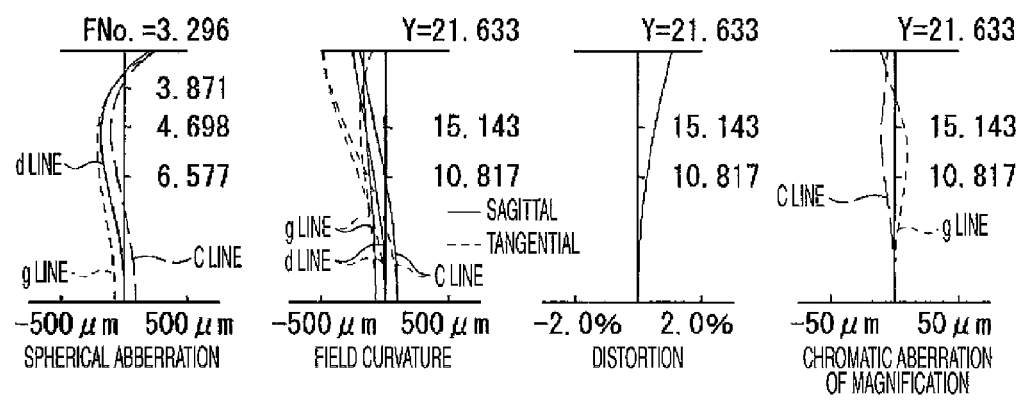
FIG. 15A, FIG. 15B, FIG. 15C, FIG. 15D illustrate aberration diagrams showing various aberrations in the telephoto focused on the short distance according to the embodiment 2 of the invention.
Figures 16A, 16B, 16C, 16D:
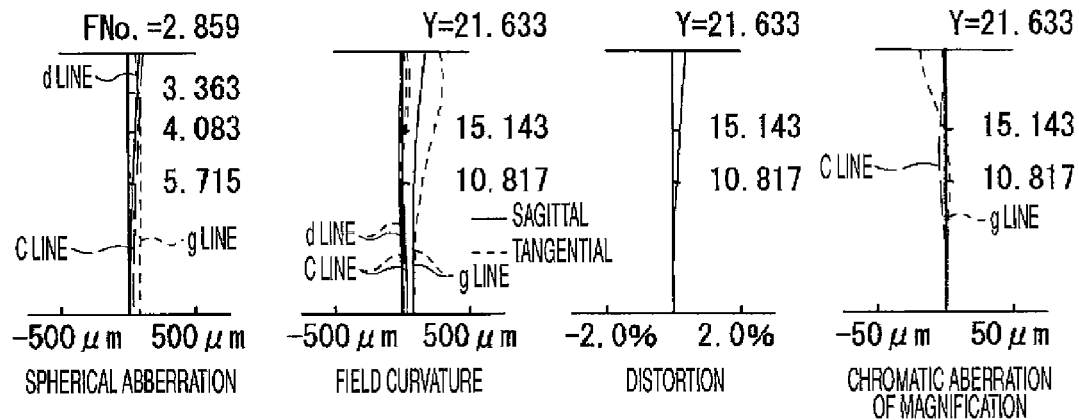
FIG. 16A, FIG. 16B, FIG. 16C, FIG. 16D illustrate aberration diagrams showing various aberrations in the telephoto lens focused on infinity according to the embodiment 3 of the invention.
Figures 17A, 17B, 17C, 17D:
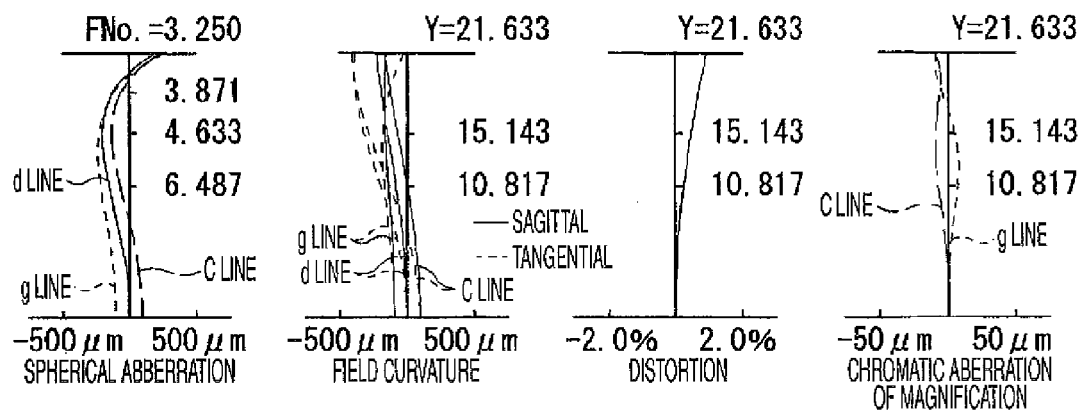
FIG. 17A, FIG. 17B, FIG. 17C, FIG. 17D illustrate aberration diagrams showing various aberrations in the telephoto lens focused on the short distance according to the embodiment 3 of the invention.
Figures 18A, 18B, 18C, 18D:
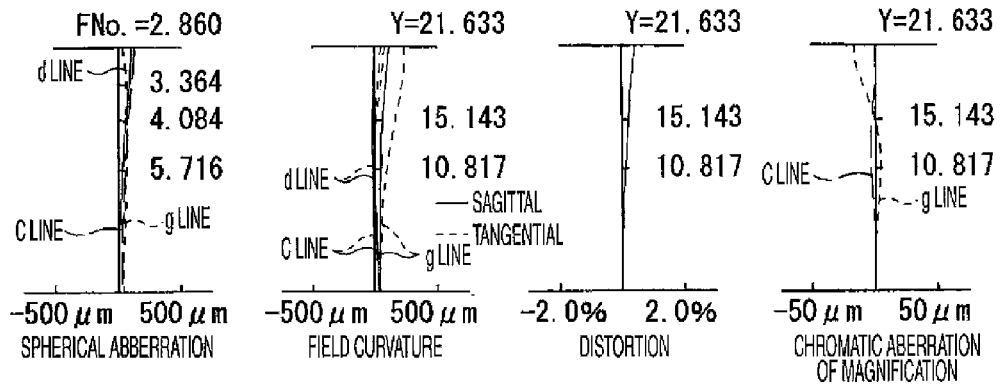
FIG. 18A, FIG. 18B, FIG. 18C, FIG. 18D illustrate aberration diagrams showing various aberrations in the telephoto lens focused on infinity according to the embodiment 4 of the invention.
Figures 19A, 19B, 19C, 19D:
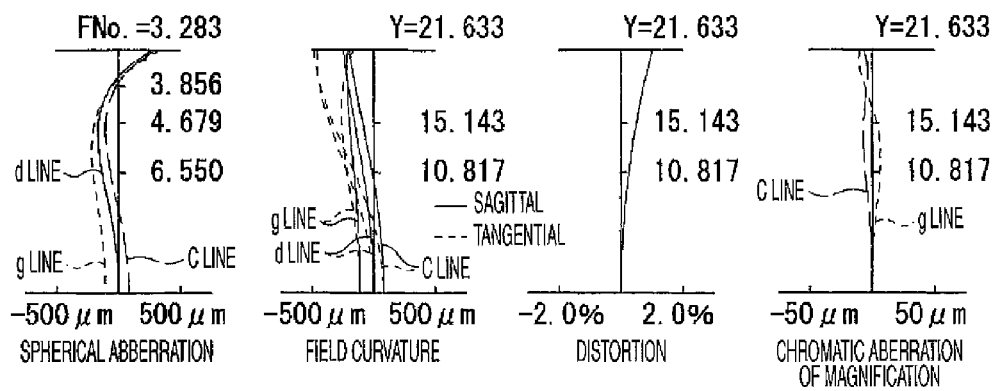
FIG. 19A, FIG. 19B, FIG. 19C, FIG. 19D illustrate aberration diagrams showing various aberrations in the telephoto lens focused on the short distance according to the embodiment 4 of the invention.
Figures 20A, 20B, 20C, 20D:
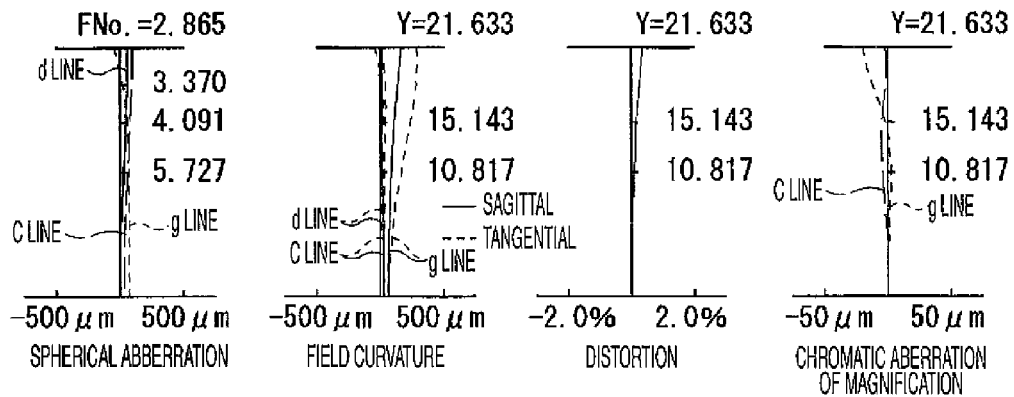
FIG. 20A, FIG. 20B, FIG. 20C, FIG. 20D illustrate aberration diagrams showing various aberrations in the telephoto lens focused on infinity according to the embodiment 5 of the invention.
Figures 21A, 21B, 21C, 21D:
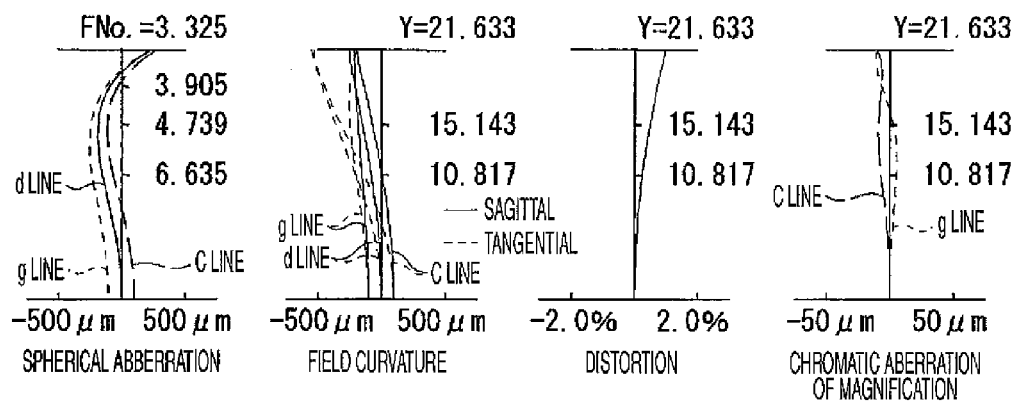
FIG. 21A, FIG. 21B, FIG. 21C, FIG. 21D illustrate aberration diagrams showing various aberrations in the telephoto lens on the short distance according to the embodiment 5 of the invention.

FIG. 1A and FIG. 1B show a first constitution example of a telephoto lens according to an embodiment of the invention. The constitution example corresponds to a lens constitution of a first numerical value example (FIG. 6A, FIG. 6B) mentioned later. Further, FIG. 2A and FIG. 2B show a second constitution example corresponding to a lens constitution of a second numerical value example (FIG. 7A, FIG. 7B) mentioned later. FIG. 3A, FIG. 3B show a third constitution example corresponding to a lens constitution of a third numerical value example (FIG. 8A, FIG. 8B) mentioned later. FIG. 4A and FIG. 4B show a fourth constitution example corresponding to a lens constitution of a numerical value example (FIG. 9A, FIG. 9B) mentioned later. FIG. 5A and FIG. 5B shows a fifth constitution example corresponding to a lens constitution of a fifth numerical value example (FIG. 10A, FIG. 10B) mentioned later. In FIG. 1A, FIG. 1B through FIG. 5A, FIG. 5B notation Ri designates a radius of curvature of an i-th surface attached with the notation by constituting a 1-th surface by a surface of a constituent element on the most object-side to be successively increased in accordance with being directed to an image side (focusing side). A notation Di designates a lens interval between i-th surface and (i+1)-th surface on an optical lens Z1. However, notations Di illustrate only portions of surface intervals. Further, FIG. 1A, FIG. 2A, FIG. 3A, FIG. 4A and FIG. 5A correspond to constitutions in focused on infinity, and FIG. 1B, FIG. 2B, FIG. 3B, FIG. 4B and FIG. 5B correspond to constitutions in focused on a short distance (2.9 m).

The telephoto lens is applicable to a camera for silver salt photograph, and an electronic still camera using an image taking element of CCD (Charge Coupled Device) or CMOS (Complementary Metal Oxide Semiconductor) or the like and is particularly preferably used for a single-lens reflex camera or the like. The telephoto lens includes a first lens group G1 having a positive refracting power, a second lens group G2 having a negative refracting power, a third lens group G3 having a positive refracting power, and a fourth lens group G4 having a negative refracting power along the optical axis Z1 in order from the object side. The second group G2 is a moving group for focusing and is made to be moved to an image face side in a direction of the optical axis Z1 in being focused on from a long distance state to a short distance state. The first lens group G1 and the second lens group G2 is configured to be substantially afocal system. The third lens group G3 is a moving group for isolation vibration and is configured to move in a direction orthogonal to the optical axis Z1 in isolation vibration. A aperture diaphragm St is arranged between the second lens group G2 and the third lens group G3.

An image face of the telephoto lens is arranged with an image taking element of CCD or the like, not illustrated. Various optical members LF is arranged between the fourth lens group G4 and an image taking element in accordance with a configuration on a side of an apparatus mounting the lens. As the optical member LF, for example, various exchange filters of an UV cut filter and the like are arranged.

The first lens group G1 includes a first sub group G1$a$ including biconvex lenses L11, L12 and biconcave lens L13 and a second sub group G1$b$ including a negative lens L14 and a positive lens L15 in order from the object side. The negative lens L14 and the positive lens L15 are configured to be a bonded lens.

The second lens group G2 includes, for example, a negative lens L21, and a cemented lens including a positive lens L22 and a negative lens L23 in order from the object side. The third lens group G3 includes, for example, a positive lens L31, a negative lens L32, and a positive lens L33 in order from the object side. The fourth lens group G4 includes, for example, a bonded lens including a negative lens L41 and a positive lens L42, and a negative lens L43 in order from the object side. The fourth lens group G4 having a negative refracting power serves as a teleconverter to the first through the third lens groups G1 through G3.

The telephoto lens satisfies the following conditions. In equations, notation f denotes a focal length of a total system, notation f1$a$ denotes a focal length of the first sub group G1$a$, notation f1$b$ denotes a focal length of the second sub group G1$b$, notation dab denotes a group interval between the first sub group G1$a$ and the second sub group G1$b$ on the axis, and notation d12 denotes a group interval between the first lens group G1 and the second lens group G2 on the axis.

$$1.5 < f1a/f1b < 2.2 \quad (1)$$

$$0.85 < f1a/f < 1.05 \quad (2)$$

$$3.0 < dab/d12 < 6.0 \quad (3)$$

It is preferable that conditional expressions (1), (2) fall in ranges of the following equations (1A), (2A). Further, $$1.7 < f1a/f1b < 2.0 \quad (1A)$$

$$0.89 < f1a/f < 1.00 \quad (2A)$$

It is preferable that the telephoto lens further satisfies the following conditional expressions. Incidentally, notation f denotes the focal length of the total system, notation f1$b$ denotes the focal length of the second sub group G1$b$, notation dab denotes the group interval between the first sub group G1$a$ and the second sub group G1$b$ on the axis. Notation R1 denotes a radius of curvature of an object-side surface of the lens L11 arranged on the most object-side in the first sub group G1$a$, Notation R2 denotes a radius of curvature of an image-side surface of the lens L11 arranged on the most object-side in the first sub group G1a and notation R9 denotes a radius of curvature of an image-side surface of the lens L15 arranged on the most image-side in the second sub group G1b.

$$-0.05 < (R2+R1)/(R2-R1) < 0.30 \quad (4)$$

$$-0.50 < f1b/R9 < 0.0 \quad (5)$$

$$0.27 < dab/f < 0.35 \quad (6)$$

It is preferable that the telephoto lens further satisfies the following conditional expression. Incidentally, notation vn1 denotes Abbe number of the negative lens L41 on the most object-side in the fourth lens group G4.

$$40 < vn1 < 55 \quad (7)$$

It is preferable that the telephoto lens further satisfies the following conditional expression. Incidentally, notation f3 denotes a focal length of the third lens group G3, and notation fm denotes a composite focal length of the third lens group G3 and the fourth lens group G4.

$$0.65 < f3/fm < 0.8 \quad (8)$$

Next, reason of configuration of the telephoto lens by the above-described configuration will be explained along with operation and effect thereof.

The telephoto lens includes the first lens group G1 having the positive refracting power, the second lens group G2 having the negative refracting power, the third lens group G3 having the positive refracting power, and the fourth lens group G4 having the negative refracting power in order from the object side. When first lens group G1 and the second lens group G2 is configured to be substantially an afocal system, a magnification thereof is denoted by a notation $\beta$, and the composite focal length of the third lens group G3 and the fourth lens group G4 is denoted by a notation, the focal length f and the magnification $\beta$ of the total system can be put as follows.

$$f = \beta \cdot fm$$

$$\beta = -f1/f2$$

where, the focal lengths of the first lens group G1 and the second lens group G2 are denoted by notations f1, f2 respectively.

Under a condition that the focal length f is constant, when the magnification $\beta$ is increased, fm is reduced, and when the aperture diaphragm St is arranged immediately before the third lens group G3, the diaphragm diameter becomes small relative to a predetermined F value. When the diaphragm diameter is small, even in a case in which moving groups are present therebefore and thereafter, an effective diameter thereof is settled to be small, also a mechanism structure for controlling these can be configured to be small to amount to compact formation of the lens barrel, which is preferable. However, when the magnification is excessively large, a height of a light ray incident on the first lens group G1 of an off-axis luminous flux is increased to make a factor of enlarging a target front lens shape of the lens. By further enlarging the large aperture lens included in the first lens group G1, a harmful influence becomes much considerable for working/weight/cost or the like.

As has already been described, according to a number of telephoto lenses of the background art described in Patent Reference 1 (JP-A-6-201989) or the like, a total length of the lens is shortened by making the positive refracting power of the first sub group G1a be larger than the positive refracting power of the successive second sub group G1b. In the background art, the lens shape is configured to make the spherical aberration having a particularly high sensitivity become as small as possible while pertinently selecting the glass used such that anomalous dispersed glass is used for correcting the chromatic aberration in the first sub group having the stronger positive refracting power. On the other hand, according to the second sub group, the positive refracting power is smaller than that of the first sub group and the amount of generating the spherical aberration is smaller than that of the first sub group, and therefore, shapes of second sub group are directed to correction of the off-axis aberration such as the field curvature or the like.

However, in order to reduce the diaphragm diameter, as described above, it is necessary to increase the magnification $\beta$. When the focal length f1 of the first lens group G1 is increased in order to increase the magnification $\beta$, the total length of the total system is increased and a harmful influence is considerable such that the lens lengths of the first lens group G1 and the second lens group G2 are increased, also the focusing amount is increased and it is necessary to arrange the diaphragm to be further remote and the like. Therefore, it is necessary that the negative refracting power which is inverse number of the focal length f2 of the second lens group G2 is increased and f1 is prevented from being increased as less as possible.

From the above-described, in order to achieve the object of the application, it is indispensable to increase the negative refracting power of the second lens group G2. Simultaneously therewith, also the composite focal length fm of the third lens group G3 and the fourth lens group G4 successive thereto is also reduced, and an angle of incidence to the third lens group G3 is increased relative to a predetermined image size. The diaphragm St is disposed between the second lens group G2 and the third lens group G3, which is inconformity with an increase in an emitting angle from the second lens group G2 for off-axis light. Further, by increasing the negative refracting power of the second lens group G2, also an angle of deviation of an optical path is increased. By the two phenomena, particularly, the angle of incidence of the off-axis light of the second lens group G2 is added to be further increased relative to the optical axis Z1. Therefore, an optical path passing the first lens group G1 of the off-axis luminous flux tends to be further remote from the optical axis Z1, and a light ray height of the off-axis light entering the first lens group G1 is increased.

Therefrom, an increase in the magnification $\beta$ for reducing the diaphragm diameter amounts to the large aperture formation of the front target lens shape to pose the considerable problem in weight/cost/working or the like. Hence, in order to avoid the harmful influence, it is necessary that the group interval d12 between the first lens group G1 and the second lens group G2 serving to enlarge the magnification is reduced, and the off-axis optical axis is restrained to be low relative to the optical axis Z1 by strongly effecting the angle of deviation of the optical path in an inverse direction by further making the positive refracting power of the second sub group G1b strong. Therefore, it is necessary to make the refracting power of the second sub group G1b larger than that of the configuration of the background art. Thereby, according to the telephoto lens of the embodiment, the second sub group G1b and the second lens group G2 are made to be close to each other than in the background art. This weakens the refracting power relative to the necessary focal length f1 of the first lens group G1 for the first sub group G1a, and the focal length f1a of the first sub group G1a is increased. This effects an influence also on a method of correcting various aberrations in the above-described first lens group G1, whereas an amount of the spherical aberration generated at the first sub group G1a is alleviated, it is necessary to take a consideration for the spherical aberration and the field curvature generated at the second sub group G1b. In view of a relationship between the first lens group G1 and the second lens group G2, there is a necessity of increasing the group interval dab between the first sub group G1a and the second sub group G1b in the first lens group G1 in order to establish substantially an afocal system by the first lens group G1 and the second lens group G2 in accordance with the negative refracting power of the second lens group G2 being strengthened and the interval d12 between the first lens group G1 and the second lens group G2 being reduced. In this way, when the magnification β is increased, it is necessary to adopt refracting power/arrangement different from those of the background art.

As described above, in order to increase the magnification β and reduce the diaphragm diameter, according to the first lens group G1, the group interval dab between the first sub group G1a and the second sub group G1b becomes larger than that of the background art. The refracting powers are reversed, the refracting power of the second sub group G1b becomes superior to the refracting power of the first sub group G1a to have the small focal length. Further, it is necessary that also the group interval d12 between the first lens group G1 and the second lens group G2 strengthening the negative refracting power is reduced. In accordance therewith, tendencies of generating various aberrations differ from those of the telephoto lens of the background art and it is necessary to optimize the shape of the first lens group G1.

According to the embodiment, as explained below, by satisfying the respective conditional expressions, the distribution of the refracting powers of the first sub group G1a and the second sub group G1b and the arrangement of the groups are optimized to restrain the diaphragm diameter to be small, the various aberrations are restrained to be small and the high performance is maintained.

Conditional expressions (1) through (3) relate to conditions relating to the distribution of the refracting powers and the arrangement of the groups of the first sub group G1a and the second sub group G1b. Conditional expression (1) rectifies a pertinent relationship between the focal length f1a of the first sub group G1a and the focal length f1b of the second sub group G1b. When lower than a lower limit of conditional expression (1), the positive refracting power of the first sub group G1a particularly having the sensitivity of generating the spherical aberration is increased, an amount of generating the spherical aberration is increased and a focusing function cannot be improved over an entire image face region such that field tilt is occurred when the amount of generating the spherical aberration is going to be reduced. Further, simultaneously therewith, the radius of curvature of the first sub group G1a including the large aperture lens is reduced, it is necessary to increase a center thickness to effect an adverse influence on cost/working/weight. When higher than an upper limit conversely, the positive refracting power of the first sub group G1a is reduced, and the positive refracting power of the second sub group G1b is increased. In this case, unless the group interval dab or d12 is increased, the sufficient magnification β is not achieved and the diaphragm diameter is increased, also the refracting power of the first sub group G1b is increased as described above, the close range function is deteriorated to pose a serious problem.

Conditional expression (2) rectifies a pertinent range of the focal length f1a of the first sub group G1a relative to the focal length f of the total system. When lower than a lower limit of conditional expression (2), the focal length f1a of the first sub group G1a is reduced. In other words, the refracting power of the first sub group G1a is increased. In this case, the refracting power of the second sub group G1b can be weakened and the group interval dab between the first sub group G1a and the second sub group G1b can be reduced, however, generation of the spherical aberration or astigmatism is increased, and the focusing function of the total system is deteriorated. In order to avoid this, the negative refracting power of the second lens group G2 is reduced, the magnification β is reduced and the diaphragm diameter is increased, which is contrary to the object of the application. When higher than an upper limit of conditional expression (2), the refracting power of the first sub group G1a is reduced. In this case, the positive refracting power of the second sub group G1b is increased, the spherical aberration is increased and also a variation in the aberration in focusing is increased, which amounts to a deterioration in the function over an entire range of a photographing range. Although in order to avoid this, it is necessary to increase the group interval dab, the lens total length of the total system becomes long and also the weight is increased to pose a problem.

Conditional expression (3) rectifies a pertinent relationship between the group interval dab between the first sub group G1a and the second sub group G1b, and the group interval d12 between the first lens group G1 and the second lens group G2. When lower than a lower limit of conditional expression (3), d12 having the large sensitivity relative to the magnification β can be increased and dab having the small sensitivity can be reduced and a lens total length can be shortened, however, the height of the light ray passing the first lens group G1 of the off-axis light is increased, in order to ensure an amount of peripheral light, the front target lens shape needs to be increased to pose a problem. Although it is also conceivable to strengthen the positive refracting power of the second sub group G1b in order to resolve this, there poses a problem in view of the focusing function of the close range function or the like. When higher than an upper limit, the lens total length is increased; the front target lens diameter is increased to be contrary to the compact formation of the total of the lens system, which is not preferable.

Conditional expressions (4) through (6) are conditions for maintaining a high performance and restraining the various aberrations to be small while restraining the diaphragm diameter to be small.

Conditional expression (4) relates to radii of curvatures R1, R2 of front and rear surfaces of the positive lens L11 disposed on the object side the most in the first sub group G1a. When lower than a lower limit of conditional expression (4), the radius of curvature R1 on the object side of the positive lens L11 becomes larger than the radius of curvature R2 on the image face side in absolute values thereof, and generation of the spherical aberration is increased. In this case, when the radius of curvature of other surface is changed, the change effects an influence on the focusing function over the entire region of the image face. When the retracting power of the positive lens L11 is weakened in order to avoid the harmful influence, the lens total length becomes excessively large, it is necessary to compensate therefor by strengthening the refracting power of the successive positive lens L12, which deteriorates a balance of the total of the function. When higher than an upper limit thereof, the field tilt is increased, when the field tilt is going to be corrected by other lens surface, the function balance is deteriorated by generating the spherical aberration.

Conditional expression (5) rectifies a pertinent relationship between the radius of curvature R9 of the most image-side lens surface of the second sub group G1b and the focal length f1b of the second sub group G1b. This is the condition for particularly making the spherical aberration of the total system as small as possible and restraining an increase in the spherical aberration when focused by the second lens group G2 relative to a change in the distance on the object side. According to the telephoto lens of the embodiment, the positive refractive power of the second sub group G1b is increased, therefore, it is important to determine the radius of curvature of the lens surface of the lens included in the second sub group G1b. When lower than a lower limit of conditional expression (5), a convex tendency to the image face side is strengthened in the shape of the positive lens L15, the negative spherical aberration or the field tilt is excessively generated, and a center image is deteriorated for the short range, which is not preferable. When higher than an upper limit conversely, the spherical aberration is generated excessively and the positive field tilt is generated, when the radius of curvature of other lens surface is changed, a difference is produced in the focusing function between the center and the periphery of the image face, and therefore, the focusing functions of the center and the periphery cannot be balanced.

Conditional expression (6) rectifies a pertinent relationship between the group interval dab between the first sub group G1a and the second sub group G1b and the focal length f of the total system. When lower than a lower limit value of conditional expression (6), the group interval dab is reduced and it is necessary to strengthen the positive refracting power of the first sub group G1a or increasing the group interval d12 between the first lens group G1 and the second lens group G2 in order to maintain the magnification β, in both of the cases, the spherical aberration and the field tilt are generated excessively. When higher than an upper limit conversely, the lens total length is excessively increased and a peripheral light amount is excessively reduced. It is necessary to have a larger aperture formation of the front group lens to effect a considerable harmful influence.

Conditional expression (7) rectifies a value of pertinent Abbe number vn1 of the negative lens L41 on the object side the most in the fourth lens group G4. The fourth lens group G4 is provided with the negative refracting power as a whole, and therefore, serves as a teleconverter for the first through the third lens groups G1 through G3. Therefore, although there is an effect of shortening the lens total length of the total system, on the other hand, there is a drawback of excessively shortening a back focus of the total system. On the other hand, when various filters achieving various effects to pictures are arranged between the fourth lens group G4 and the image face, a predetermined or more of back focus is needed. In order to satisfy the above-described conflicting conditions, by preceding the negative lens L41 at a the most object-side surface in the fourth lens group G4, bonding the negative lens L41 and the successive positive lens L42 to have a radius of curvature of the bonded surface by a surface having strong convex on the object side, flattening of the image face can be achieved by utilizing a difference of refracting indices of the both lenses, and by making Abbe number of glass used fall in the range indicated by conditional expression (7), also the chromatic aberration can excellently be corrected.

Conditional expression (8) rectifies a pertinent relationship of the focal length f3 of the third lens group G3 relative to the composite focal length fm of the third lens group 63 and the fourth lens group G4. According to the telephoto lens, when the composite system of the first lens group G1 and the second lens group G2 is substantially afocal and the magnification β of the telescopic system thereby is limited, also the composite focal length fm is limited. Therefore, when the focal length f3 of the third lens group G3 is shortened by exceeding a lower limit of conditional expression (8), an enlarging rate by the fourth lens group is increased, the telescopic effect is increased and the total length is shortened, however, also the back focus is shortened and it is difficult to ensure a location of arranging successive filters. Further, also when the third lens group G3 is configured to be a vibration isolation function group, deterioration in the function is increased when the third lens group G3 is moved in a direction orthogonal to the optical axis Z1. Conversely, when the focal length f3 of the third lens group G3 is lengthened by exceeding an upper limit of conditional expression (8), the lens total length is increased, which is not preferable. Further, a shift amount when the third lens group G3 is moved in the vertical direction for correcting vibration is increased and a movable space is increased to enlarge the barrel diameter.

As described above, according to the telephoto lens of the embodiment, the first lens group G1 having the positive refracting power, the second lens group G2 having the negative refracting power, the third lens group G3 having the positive refracting power, and the fourth lens group G4 having the negative refracting power are arranged in order from the object side, the second lens group G2 is configured to be the focusing group to thereby optimize the configuration by satisfying pertinent conditions different from those of the background art, and therefore, there can be provided the lens system advantageous for downsizing the moving groups and suitable for the large aperture formation and ultra telescopic formation by maintaining an excellent optical performance from a long distance to a close range.

Particularly, by reducing the diaphragm diameter and reducing the lens weight of the moving group, there can be provided the telephoto lens system preferable for a silver salt or digital single-lens reflex camera having an excellent response for focusing or isolating vibration. Further, by adding protection glass in front of the first lens group G1, anomalous dispersed glass which is easy to be scratched can be protected and by providing a weak radius of curvature without a refracting power, also reflection from a focusing face can be prevented, which can deal with a digital specification of current time.

Next, an explanation will be given of specific numerical value examples of the telephoto lens according to the embodiment. In the following, a first through a fifth numerical value example will collectively be explained.

FIG. 6A shows a specific lens data in correspondence with a constitution of a telephoto lens focused on infinity shown in FIG. 1A as embodiment 1. A column of surface No.Si shows a number of an i-th (i=1 through 28) surface attached with a notation by constituting 1-th by a surface of a constituent element on the object side the most and increasing successively in accordance with proceeding to the image side. A column of radius of curvature Ri shows a value (mm) of a radius of curvature of the i-th surface on an object side in correspondence with notation Ri attached in FIG. 1A. Also a column of surface interval Di shows an interval (mm) on the optical axis between the i-th surface Si and an (i+1)-th surface Si+1 similarly from the object side. A column of Ndi shows a value of a refractive index for d line (wavelength 587.6 nm) between the i-th surface Si and the (i+1)-th surface Si+1 from the object side. A column of vdj shows a value of Abbe number for d line of a j-th optical element from the object side.

Further, FIG. 6B shows values of the focal length f (mm) of the total system, F number (F No.), and field angle $2\overline{\omega}$ ($\overline{\omega}$=semi field angle). According to the telephoto lens, in focusing on from a long distance to a short distance, the second lens group G2 is moved to the image face side in the optical axis direction. Therefore, surface intervals D9, D14 before and after the second lens group G2 are changed in focusing. FIG. 6B also shows values of surface intervals D9, D14 changed in focusing on infinity and a short distance (2.9 m).

Similar to the telephoto lens according to embodiment 1, a specific lens data in correspondence with a constitution of a telephoto lens shown in FIG. 2A is shown in FIG. 7A as embodiment 2 and various data thereof is shown in FIG. 7B. Further, similarly, a specific lens data in correspondence with a constitution of a telephoto lens shown in FIG. 3A is shown in FIG. BA as embodiment 3 and various data thereof are shown in FIG. 8B. Similarly, a specific lens data in correspondence with a constitution of a telephoto lens shown in FIG. 4A is shown in FIG. 9A as embodiment 4 and various data thereof are shown in FIG. 9B. Similarly, a specific lens data in correspondence with a constitution of a telephoto lens shown in FIG. 5A is shown in FIG. 10A as embodiment 5 and various data thereof are shown in FIG. 10B.

As is known from the above-described data, with regard to respective examples, F numbers are about 2.8, focal lengths of total systems become about 400 mm. Further, diaphragm open diameters become ϕ38.67 mm through ϕ39.12 mm.

Further, the diaphragm open diameters are specifically as follows with regard to respective examples.

Embodiment 1: ϕ38.67 mm
Embodiment 2: ϕ38.90 mm
Embodiment 3: ϕ39.12 mm
Embodiment 4: ϕ38.70 mm
Embodiment 5: ϕ38.68 mm FIG. 11 collectively shows values with regard to the above-described conditional expressions (1) through (8) with regard to respective embodiments. As is known from FIG. 11, values of the respective embodiments are within numerical value ranges of the respective condition equations.

FIG. 12A through FIG. 12D respectively show spherical aberrations, astigmatism aberrations, distortions (warp aberrations), and magnification chromatic aberrations in an infinitive distant focusing state of the telephoto lens according to embodiment 1. Further, FIG. 13A through FIG. 13D respectively show spherical aberrations, astigmatism aberrations, warp aberrations, and magnification chromatic aberrations in focusing on a short distance (2.9 m) of the telephoto lens according to embodiment 1. In respective aberration diagrams, respective aberrations are shown when d line is wavelength standard. In a spherical aberration diagram, an astigmatism aberration diagram and a magnification chromatic aberration diagram, also aberrations with regard to g line (wavelength 435.8 nm), C line (wavelength 656.3 nm) are shown. In the astigmatism aberration diagram, a bold line designates an aberration in a sagittal aberration and a broken line designates an aberration in a tangential direction. FNo. denotes F value, and Y denotes an image height.

Similarly, FIG. 14A through FIG. 14D show various aberrations in an infinitive distant focusing state of the telephoto lens according to embodiment 2, and FIG. 15A through FIG. 15D show various aberrations in a short distance focusing state. Further, similarly, FIG. 16A through FIG. 16D show various aberrations in the infinitive distant focusing state of the telephoto lens according to embodiment 3 and FIG. 17A through FIG. 17D show various aberrations in the short distance focusing state. Similarly, FIG. 18A through FIG. 18D show various aberrations in the infinitive focusing state of the telephoto lens according to embodiment 4 and FIG. 19A through FIG. 19D show various aberrations in the short distance focusing state. Similarly, FIG. 20A through FIG. 20D show various aberrations in the infinitive distant focusing state of the telephoto lens according to embodiment 5 and FIG. 21A through FIG. 21D show various aberrations in focusing on the short distance.

As is known from the numerical data and respective aberration diagrams, with regard to the respective examples, the moving groups are downsized while maintaining an excellent optical function from a long distance to a close range and a lens system of a large aperture ratio and ultra telescopic type can be realized. Particularly, according to the embodiment, as F2.8/400, the diaphragm open diameter becomes ϕ38.76 mm through ϕ39.12 mm. On the other hand, in the background art, in Patent Reference 1 (JP-A-6-201989) and Patent Reference 2 (JP-A-8-327897), there are constitution examples of diaphragm open diameters ϕ38.68 mm, 37.26 mm in F2.8/300. According to the examples, although the focal lengths are longer than those of the background art, the diaphragm open diameters substantially stay to be the same values. Further, although according to Patent Reference 4 (JP-A-11-160617), there is a constitution example of the diaphragm open diameter ϕ50.39 mm in F2.8/400, according to the embodiment, the diaphragm open diameter is sufficiently smaller than that of the background art.

Further, the invention is not limited to the above-described embodiments and respective examples but can be modified to embody. For examples values of radii of curvature, surface intervals and refractive indices of respective lens components are not limited to values shown in the respective numerical value examples but can adopt other values.

What is claimed is:

1. A telephoto lens comprising, in order from an object side:
    a first lens group having a positive refracting power, the first lens group comprising a first sub group and a second sub group;
    a second lens group having a negative refracting power;
    a third lens group having a positive refracting power;
    a fourth lens group having a negative refracting power,
    wherein when focusing from infinity to a near point, the second lens group is moved to an image side in an optical axis direction,
    wherein the first sub group having two biconvex lenses and a biconcave lens, and the second sub group having a negative lens and a positive lens, and
    wherein the following Conditional Expression (1) is satisfied:

$$1.5 < f1a/f1b < 2.2 \qquad (1)$$

where,
    $f1a$ denotes a focal length of the first sub group, and
    $f1b$ denotes a focal length of the second sub group.

2. The telephoto lens according to claim 1,
    wherein the following Conditional Expressions (2) to (3) are further satisfied:

$$0.85 < f1a/f < 1.05 \qquad (2)$$

$$3.0 < dab/d12 < 6.0 \qquad (3)$$

where,
    f denotes a focal length of the telephoto lens,
    $f1a$ denotes the focal length of the first sub group,
    dab denotes an interval between the first sub group and the second sub group on the optical axis, and
    d12 denotes an interval between the first lens group and the second lens group on the optical axis.

3. The telephoto lens according to claim 1,
wherein the following Conditional Expressions (4) to (6) are further satisfied:

$$-0.05<(R2+R1)/(R2-R1)<0.30 \quad (4)$$

$$-0.50<f1b/R9<0.0 \quad (5)$$

$$0.27<dab/f<0.35 \quad (6)$$

where,
f denotes the focal length of the telephoto lens,
f1b denotes the focal length of the second sub group,
dab denotes the interval between the first sub group and the second sub group,
R1 denotes a radius of curvature of an object-side surface of the most object-side lens in the first sub group,
R2 denotes a radius of curvature of an image-side surface of the most object-side lens in the first sub group, and
R9 denotes a radius of curvature of an image-side surface of the most image-side lens in the second sub group.

4. The telephoto lens according to claim 1,
wherein the fourth lens group comprises in order from the object side:
a cemented lens having a negative lens and a positive lens; and
a negative lens,
wherein the following Conditional Expression (7) is satisfied:

$$40<vn1<55 \quad (7)$$

where,
vn1 denotes Abbe number of the negative lens on the most object-side in the fourth lens group.

5. The telephoto lens according to claim 1,
wherein the following Conditional Expression (8) is further satisfied:

$$0.65<f3/fm<0.8 \quad (8)$$

where,
f3 denotes a focal length of the third lens group, and
fm denotes a composite focal length of the third lens group and the fourth lens group.

6. The telephoto lens according to claim 2,
wherein the following Conditional Expression (4) to (6) are further satisfied:

$$-0.05<(R2+R1)/(R2-R1)<0.30 \quad (4)$$

$$-0.50<f1b/R9<0.0 \quad (5)$$

$$0.27<dab/f<0.35 \quad (6)$$

where,
f denotes the focal length of the telephoto lens,
f1b denotes the focal length of the second sub group,
dab denotes the interval between the first sub group and the second sub group,
R1 denotes a radius of curvature of an object-side surface of the most object-side lens in the first sub group,
R2 denotes a radius of curvature of an image-side surface of the most object-side lens in the first sub group, and
R9 denotes a radius of curvature of an image-side surface of the most image-side lens in the second sub group.

7. The telephoto lens according to claim 2,
wherein the fourth lens group comprises in order from the object side:
a cemented lens having a negative lens and a positive lens; and
a negative lens,
wherein the following Conditional Expression (7) is satisfied:

$$40<vn1<55 \quad (7)$$

where,
vn1 denotes Abbe number of the negative lens on the most object-side in the fourth lens group.

8. The telephoto lens according to claim 2,
wherein the following Conditional Expression (8) is further satisfied:

$$0.65<f3/fm<0.8 \quad (8)$$

where,
f3 denotes a focal length of the third lens group, and
fm denotes a composite focal length of the third lens group and the fourth lens group.

9. The telephoto lens according to claim 3,
wherein the fourth lens group comprises in order from the object side:
a cemented lens having a negative lens and a positive lens; and
a negative lens,
wherein the following Conditional Expression (7) is satisfied:

$$40<vn1<55 \quad (7)$$

where,
vn1 denotes Abbe number of the negative lens on the most object-side in the fourth lens group.

10. The telephoto lens according to claim 3,
wherein the following Conditional Expression (8) is further satisfied:

$$0.65<f3/fm<0.8 \quad (8)$$

where,
f3 denotes a focal length of the third lens group, and
fm denotes a composite focal length of the third lens group and the fourth lens group.

11. The telephoto lens according to claim 4,
wherein the following Conditional Expression (8) is further satisfied:

$$0.65<f3/fm<0.8 \quad (8)$$

where,
f3 denotes a focal length of the third lens group, and
fm denotes a composite focal length of the third lens group and the fourth lens group.

12. The telephoto lens according to claim 6,
wherein the fourth lens group comprises in order from the object side:
a cemented lens having a negative lens and a positive lens; and
a negative lens,
wherein the following Conditional Expression (7) is satisfied:

$$40<vn1<55 \quad (7)$$

where,
vn1 denotes Abbe number of the negative lens on the most object-side in the fourth lens group.

13. The telephoto lens according to claim 6,
wherein the following Conditional Expression (8) is further satisfied:

$$0.65<f3/fm<0.8 \quad (8)$$

where,
f3 denotes a focal length of the third lens group, and
fm denotes a composite focal length of the third lens group and the fourth lens group.

14. The telephoto lens according to claim 7, wherein the following Conditional Expression (8) is further satisfied:

$$0.65 < f3/fm < 0.8 \quad (8)$$

where,
f3 denotes a focal length of the third lens group, and
fm denotes a composite focal length of the third lens group and the fourth lens group.

15. The telephoto lens according to claim 9, wherein the following Conditional Expression (8) is further satisfied:

$$0.65 < f3/fm < 0.8 \quad (8)$$

where,
f3 denotes a focal length of the third lens group, and
fm denotes a composite focal length of the third lens group and the fourth lens group.

16. The telephoto lens according to claim 12, wherein the following Conditional Expression (8) is further satisfied:

$$0.65 < f3/fm < 0.8 \quad (8)$$

where,
f3 denotes a focal length of the third lens group, and
fm denotes a composite focal length of the third lens group and the fourth lens group.

17. A telephoto lens comprising, in order from an object side:
a first lens group having a positive refracting power, the first lens group comprising a first sub group and a second sub group;
a second lens group having a negative refracting power;
a third lens having a positive refracting power; and
a fourth lens group having a negative refracting power,
wherein when focusing from infinity to a near point, the second lens group is moved to an image side in an optical axis direction,
wherein the first sub group having two biconvex lenses and a biconcave lens, and the second sub group having a negative lens and a positive lens, and
wherein the following Conditional Expressions (4) and (6) are satisfied:

$$-0.05 < (R2+R1)/(R2-R1) < 0.30 \quad (4)$$

$$0.27 < dab/f < 0.35 \quad (6)$$

where,
f denotes a focal length of the telephoto lens,
dab denotes an interval between the first sub group and the second sub group on the optical axis,
R1 denotes a radius of curvature of a surface of an object-side surface of the most object-side lens in the first sub group, and
R2 denotes a radius of curvature of a surface of an image-side surface of the most object-side lens in the first sub group.

18. The telephoto lens according to claim 17, wherein the following Conditional Expression (5) is further satisfied:

$$-0.50 < f1b/R9 < 0.0 \quad (5)$$

where,
f1b denotes a focal length of the second sub group, and
R9 denotes a radius of curvature of a surface of an image-side surface of the most image-side lens in the second sub group.

19. The telephoto lens according to claim 17, wherein the fourth lens group comprises in order from the object side:
a cemented lens having a negative lens and a positive lens; and
a negative lens,
wherein the following Conditional Expression (7) is satisfied:

$$40 < vn1 < 55 \quad (7)$$

where,
vn1 denotes Abbe number of the negative lens on the most object-side in the fourth lens group.

20. The telephoto lens according to claim 17, wherein the following Conditional Expression (8) is satisfied:

$$0.65 < f3/fm < 0.8 \quad (8)$$

where,
f3 denotes a focal length of the third lens group, and fm denotes a composite focal length of the third lens group and the fourth lens group.

21. The telephoto lens according to claim 18, wherein the fourth lens group comprises in order from the object side:
a cemented lens having a negative lens and a positive lens; and
a negative lens,
wherein the following Conditional Expression (7) is satisfied:

$$40 < vn1 < 55 \quad (7)$$

where,
vn1 denotes Abbe number of the negative lens on the most object-side in the fourth lens group.

22. The telephoto lens according to claim 18, wherein the following Conditional Expression (8) is satisfied:

$$0.65 < f3/fm < 0.8 \quad (8)$$

where,
f3 denotes a focal length of the third lens group, and
fm denotes a composite focal length of the third lens group and the fourth lens group.

23. The telephoto lens according to claim 19, wherein the following Conditional Expression (8) is satisfied:

$$0.65 < f3/fm < 0.8 \quad (8)$$

where,
f3 denotes a focal length of the third lens group, and fm denotes a composite focal length of the third lens group and the fourth lens group.

24. The telephoto lens according to claim 21, wherein the following Conditional Expression (8) is satisfied:

$$0.65 < f3/fm < 0.8 \quad (8)$$

where,
f3 denotes a focal length of the third lens group, and fm denotes a composite focal length of the third lens group and the fourth lens group.

* * * * *